(12) United States Patent
Kwak et al.

(10) Patent No.: US 8,675,766 B2
(45) Date of Patent: Mar. 18, 2014

(54) WIRELESS COMMUNICATION SYSTEM USING PILOT SUBCARRIER ALLOCATION

(75) Inventors: Jin Sam Kwak, Anyang-si (KR); Jinsoo Choi, Anyang-si (KR); Kiho Nam, Anyang-si (KR); Seung Woo Nam, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/456,087

(22) Filed: Apr. 25, 2012

(65) Prior Publication Data

US 2012/0207237 A1 Aug. 16, 2012

Related U.S. Application Data

(63) Continuation of application No. 12/208,213, filed on Sep. 10, 2008, now Pat. No. 8,199,843.

(60) Provisional application No. 61/045,624, filed on Apr. 17, 2008, provisional application No. 61/021,894, filed on Jan. 17, 2008.

(30) Foreign Application Priority Data

Sep. 10, 2007 (KR) .................. 10-2007-0091730
Aug. 11, 2008 (KR) .................. 10-2008-0078433

(51) Int. Cl.
*H04B 7/02* (2006.01)
*H04L 1/02* (2006.01)

(52) U.S. Cl.
USPC ........................................... 375/267

(58) Field of Classification Search
USPC ......... 375/219, 259, 260, 267, 295, 299, 340, 375/346, 347; 370/206, 208, 278, 281, 315, 370/329, 330, 343
See application file for complete search history.

(56) References Cited

U.S. PATENT DOCUMENTS 7,227,905 B2 6/2007 Viswanathan
2005/0243939 A1 11/2005 Jung et al.
(Continued)

FOREIGN PATENT DOCUMENTS

EP 1701464 9/2006
JP 2003304215 10/2003
(Continued)

OTHER PUBLICATIONS

NTT DoCoMo et al., "Pilot Channel Structure in Evolved UTRA Downlink", R1-050705, 3GPP TSG RAN WG1 #42 on LTE, Aug. 2005.
(Continued)

*Primary Examiner* — Sam K Ahn
*Assistant Examiner* — Syed Haider
(74) *Attorney, Agent, or Firm* — Lee, Hong, Degerman, Kang & Waimey

(57) ABSTRACT

A method of transmitting pilot signals by a transmitter in a multiple-input multiple-output (MIMO) antenna system using an orthogonal frequency division multiplexing (OFDM) scheme includes allocating pilot subcarrier locations within a resource block including OFDM symbols in a time domain and subcarriers in a frequency domain based on variables of '18k', '9mi' and 'floor (ns/2)', wherein 'k' indicates a subchannel index, 'ns' indicates a symbol index, 'mi' corresponds to '(ns+i)mod 2', 'i' indicates an antenna index, wherein 'floor (n)' denotes a greatest integer that is not greater than 'n'; and transmitting the pilot signals to a receiver based on the allocated pilot subcarrier locations.

16 Claims, 28 Drawing Sheets

(56) References Cited

U.S. PATENT DOCUMENTS

| | | | |
|---|---|---|---|
| 2005/0286408 A1* | 12/2005 | Jin et al. | 370/208 |
| 2006/0039312 A1 | 2/2006 | Walton et al. | |
| 2006/0280113 A1 | 12/2006 | Huo | |
| 2006/0285479 A1* | 12/2006 | Han et al. | 370/203 |
| 2007/0053282 A1 | 3/2007 | Tong et al. | |
| 2007/0070944 A1 | 3/2007 | Rinne et al. | |
| 2007/0086535 A1 | 4/2007 | Wang et al. | |
| 2007/0202816 A1* | 8/2007 | Zheng | 455/91 |
| 2007/0258357 A1 | 11/2007 | Akita | |
| 2008/0212702 A1* | 9/2008 | Pan et al. | 375/260 |
| 2008/0219235 A1* | 9/2008 | Ma et al. | 370/344 |
| 2008/0240273 A1 | 10/2008 | Akita | |
| 2008/0253279 A1* | 10/2008 | Ma et al. | 370/206 |
| 2009/0067534 A1 | 3/2009 | Kwak et al. | |
| 2009/0285173 A1 | 11/2009 | Koorapaty et al. | |

FOREIGN PATENT DOCUMENTS

| | | |
|---|---|---|
| WO | 2005/088882 | 9/2005 |
| WO | 2006/096007 | 9/2006 |
| WO | 2007-098456 | 8/2007 |
| WO | 2007096820 | 8/2007 |

OTHER PUBLICATIONS

Intel Corporation, "Reference Signal Design for Downlink MIMO", R1-061067, 3GPP TSG RAN WG1 #44-bis, Mar. 2006.

Yaniv, et al., "Pilot Arrangement in FUSC—Reply to Comment #433", IEEE 802.16 Broadband Wireless Access Working Group, IEEE C802.16e-04/238, Jul. 2004, 14 pages.

IEEE Computer Society and the IEEE Microwave Theory and Techniques Society, IEEE Standard for Local and Metropolitan area networks, Part 16: Air Interface for Broadband Wireless Access Systems Amendment 2: Physical and Medium Access Control Layers for Combined Fixed and Mobile Operation in Licensed Bands and Corrigendum 1, Feb. 2006, pp. 575-577.

Wang, et al., "Enhancement of STC/MIMO Pilots," IEEE 802.16 Broadband Wireless Access Working Group, IEEE C80216e-04/301r1, Sep. 2004, 12 pages.

Li, et al., "Corrected pilot allocation for 4 BS transmit antennas," IEEE 802.16 Broadband Wireless Access Working Group, IEEE C802.16e-04/531r2, Nov. 2004, 4 pages.

M.K. Ozdemir et al., "Channel Estimation for Wireless OFDM Systems," IEEE Communications Surveys, vol. 9, No. 2, pp. 18-48, Apr. 2007, XP-011186984.

Wimax Forum, "Mobile WiMAX—Part 1: A Technical Overview and Performance Evaluation," Aug. 2006.

Zhao, X., et al., "A Comparative Analysis of Pilot Placement Schemes in Frequency-Selective Fast Fading MIMO Channel," Wireless Telecommunications Symposium (WTS 2007), pp. 1-7, Apr. 26, 2007.

Simeone, O., et al., "Adaptive Pilot Pattern for OFDM Systems," IEEE International Conference on Communications, vol. 2, pp. 978-82, Jun. 20, 2004.

Sawahashi, M., et al., "Evolved UTRA Technologies," Enhanced Radio Access Technologies for Next Generation Mobile Communication, Chapter 7, pp. 217-76, May 1, 2007.

Nortel Networks, "Comment on Pilot Allocation for 5,6,7 and 8 BS Antennas", IEEE 802.16 Broadband Wireless Access Working Group, IEEE C802.16e-04/563, Nov. 2004.

Intel Corporation, "Clarification on the allocation for beamformed pilots", IEEE 802.16 Broadband Wireless Access Working Group, IEEE C802.16e-05/049r2, Jan. 2005.

\* cited by examiner

| | Time → | | | | |
|---|---|---|---|---|---|
| P1 | P2 | P8 | P7 | | |
| P3 | P4 | | | | |
| P5 | P6 | | | | |
| P7 | P8 | | | P1 | P2 |
| | | | | P3 | P4 |
| | | | | P5 | P6 |
| | | P1 | P2 | P7 | P8 |
| | | P3 | P4 | | |
| | | P5 | P6 | | |
| P2 | P1 | P7 | P8 | | |
| P4 | P3 | | | | |
| P6 | P5 | | | | |
| P8 | P7 | | | P2 | P1 |
| | | | | P4 | P3 |
| | | | | P6 | P5 |
| | | P2 | P1 | P8 | P7 |
| | | P4 | P3 | | |
| | | P6 | P5 | | |

Freq. ↓

FIG. 18

| | | P6 | P5 | | |
|---|---|---|---|---|---|
| P1 | P2 | P8 | P7 | | |
| P3 | P4 | | | | |
| P5 | P6 | | | | |
| P7 | P8 | | | P1 | P2 |
| | | | | P3 | P4 |
| | | | | P5 | P6 |
| | | P1 | P2 | P7 | P8 |
| | | P3 | P4 | | |
| | | P5 | P6 | | |
| P2 | P1 | P7 | P8 | | |
| P4 | P3 | | | | |
| P6 | P5 | | | | |
| P8 | P7 | | | P2 | P1 |
| | | | | P4 | P3 |
| | | | | P6 | P5 |
| | | P2 | P1 | P8 | P7 |
| | | P4 | P3 | | |

Pilot overhead : 11.11%

Pilot overhead : 11.11%

Pilot overhead : 22.22%

Pilot overhead : 22.22%

FIG. 28

|    |    |    |    |    |    |
|----|----|----|----|----|----|
| P1 | P2 | P4 | P3 |    |    |
|    |    |    |    |    |    |
|    |    |    |    |    |    |
| P3 | P4 |    |    | P1 | P2 |
|    |    |    |    |    |    |
|    |    |    |    |    |    |
|    |    | P1 | P2 | P3 | P4 |
|    |    |    |    |    |    |
|    |    |    |    |    |    |
| P2 | P1 | P3 | P4 |    |    |
|    |    |    |    |    |    |
|    |    |    |    |    |    |
| P4 | P3 |    |    | P2 | P1 |
|    |    |    |    |    |    |
|    |    |    |    |    |    |
|    |    | P2 | P1 | P4 | P3 |
|    |    |    |    |    |    |

WIRELESS COMMUNICATION SYSTEM USING PILOT SUBCARRIER ALLOCATION

CROSS-REFERENCE TO RELATED APPLICATIONS

This application is a continuation of U.S. patent application Ser. No. 12/208,213, filed on Sep. 10, 2008, now U.S. Pat. No. 8,199,843, which claims the benefit of earlier filing date and right of priority to Korean Patent Application Nos. 10-2008-0078433, filed on Aug. 11, 2008, and 10-2007-0091730, filed on Sep. 10, 2007, and also claims the benefit of U.S. Provisional Application Ser. Nos. 61/045,624, filed on Apr. 17, 2008, and 61/021,894, filed on Jan. 17, 2008, the contents of which are all hereby incorporated by reference herein in their entirety.

FIELD OF THE INVENTION

The present invention relates to a wireless communication system. In particular, the present invention relates to a method of allocating pilot subcarriers in the wireless communication system including a multiple-input multiple-output (MIMO) antenna system.

DESCRIPTION OF THE RELATED ART

The Institute of Electrical and Electronics Engineers (IEEE) 802.16 standard provides a technology of supporting a broadband wireless access and a protocol. The standardization has been progressed since 1999 and IEEE 802.16-2001 was approved in 2001. This has been established based on a single carrier physical layer called "WirelessMAN-SC". In the IEEE 802.16a which was approved in 2003, "WirelessMAN-OFDM" and "WirelessMAN-OFDMA" were added to a physical layer in addition to "WirelessMAN-SC". After the IEEE 802.16a standard was completed, a revised IEEE 802.16-2004 was approved in 2004. In order to correct bugs and errors of the IEEE 802.16-2004, IEEE 802.16-2004/Cor1 was completed in the form of "corrigendum" in 2005.

A MIMO antenna technology improves data transmission/reception efficiency using multiple transmission antennas and multiple reception antennas. The MIMO technology was introduced in the IEEE 802.16a standard and has been continuously updated.

The MIMO technology is divided into a spatial multiplexing method and a spatial diversity method. In the spatial multiplexing method, since different data is simultaneously transmitted, data can be transmitted at a high speed without increasing the bandwidth of a system. In the spatial diversity method, since the same data is transmitted via multiple transmission antennas so as to obtain diversity gain, reliability of the data is increased.

A receiver needs to estimate a channel in order to restore data transmitted from a transmitter. Channel estimation indicates a process of compensating for distortion of a signal, which occurs by a rapid environment variation due to fading and restoring the transmission signal. In general, for channel estimation, the transmitter and the receiver need to know pilots.

In the MIMO system, a signal experiences a channel corresponding to each antenna. Accordingly, it is necessary to arrange the pilots in consideration of multiple antennas. While the number of pilots is increased as the number of antennas is increased, it is impossible to increase the number of antennas so as to increase a data transfer rate.

In the prior art, different pilot allocation structures have been designed and used according to permutation (dispersion/AMC) methods. This is because the permutation methods are separated from each other in time domain in the IEEE 802.16e system and thus structures differently optimized according to permutation methods are designed. If the permutation methods coexist in certain time instance, a unified basic data allocation structure is necessary.

In the prior art, since severe pilot overhead occurs, a transfer rate is decreased. In addition, since the same pilot structure is applied to adjacent cells or sectors, collision between the cells or the sectors may occur. Accordingly, there is a need for a method of efficiently allocating pilot subcarriers in the MIMO system.

SUMMARY OF THE INVENTION

An object of the present invention is to provide a method of efficiently allocating pilot subcarriers in wireless communication system including a MIMO system. The object of the present invention can be achieved by providing a method of allocating pilot subcarriers for a plurality of antennas in the MIMO antenna system over a plurality of orthogonal frequency division multiplexing (OFDM) symbols and a plurality of subcarriers. The method includes allocating each of the pilot subcarriers for the plurality of antennas by the same number in every OFDM symbols. The pilot subcarriers form pairs of two pilot subcarriers and are allocated to be alternately arranged on two contiguous OFDM symbols in a time domain.

According to an embodiment of the present invention, a method of allocating pilot subcarriers for use in downlink and uplink communication in the MIMO antenna system using OFDM modulation is provided. The method includes providing a frame structure comprising OFDM symbols in time domain and subcarriers in frequency domain and allocating pilot locations according to equation:

$$P_i = 18k + 9m_i + 3(\lfloor n_s/2 \rfloor \bmod 3)$$

where, $P_i$ denotes pilot index of an $i^{th}$ antenna, k=0, 1, ..., $N_{pilot}$, i=$(n_s+i) \bmod 2$, and $\lfloor n \rfloor$ denotes an integer smaller than n.

According to an embodiment of the present invention, the method of allocating pilot subcarriers for use in at least one of downlink and uplink communication in the MIMO antenna system using OFDM modulation includes providing a frame structure comprising OFDM symbols in time domain and subcarriers in frequency domain and alternately allocating first pilot subcarriers for a first antenna and second pilot subcarriers for a second antenna in at least one of the time and frequency domains, wherein each of the alternating first pilot subcarriers and the second pilot subcarriers are separated by a multiple of a first predetermined number of subcarriers in the frequency domain and further allocated in two contiguous OFDM symbols, wherein the first predetermined number is 9.

In an aspect of the present invention, each of the first pilot subcarriers separated by two OFDM symbols is shifted by a second predetermined number of subcarriers, and each of the second pilot subcarriers separated by two OFDM symbols is shifted by the second predetermined number of subcarriers to differentiate frequency selectivity, wherein the second predetermined number is a multiple of 3. Each OFDM symbol comprises first and second pilot subcarriers. Preferably, number of each of the first and second pilot subcarriers in each OFDM symbol is the same. Preferably, the second predetermined number is 3. The frame structure is used in one of uplink and downlink communications.

In another aspect of the present invention, the method further includes alternately allocating third pilot subcarriers for a third antenna and fourth pilot subcarriers for a fourth antenna in the time and frequency domains, wherein each of the alternating third pilot subcarriers and the fourth pilot subcarriers are separated by the multiple of the first predetermined subcarriers in the frequency domain and further allocated in two contiguous OFDM symbols. Preferably, the first pilot subcarriers are adjacent to the third pilot subcarriers in the frequency domain and the second pilot subcarriers are adjacent to the fourth pilot subcarriers in the frequency domain. Preferably, the first pilot subcarriers and the third pilot subcarriers are separated by at least one subcarrier in the frequency domain and the second pilot subcarriers and the fourth pilot subcarriers are separated by at least one subcarrier in the frequency domain.

In one aspect of the present invention, the method may further include alternately allocating fifth pilot subcarriers for a fifth antenna and sixth pilot subcarriers for a sixth antenna in the time and frequency domains, wherein each of the alternating fifth pilot subcarriers and the sixth pilot subcarriers are separated by the multiple of the first predetermined subcarriers in the frequency domain and further allocated in two contiguous OFDM symbols and alternatively allocating seventh pilot subcarriers for a seventh antenna and eighth pilot subcarriers for a eighth antenna in the time and frequency domains, wherein each of the alternating seventh pilot subcarriers and the eighth pilot subcarriers are separated by the multiple of the first predetermined subcarriers in the frequency domain and further allocated in two contiguous OFDM symbols, wherein the fifth pilot subcarriers are adjacent to and positioned between the third and seventh pilot subcarriers in the frequency domain and the sixth pilot subcarriers are adjacent to and positioned between the fourth and eighth pilot subcarriers in the frequency domain. In another aspect of the present invention, the fifth pilot subcarriers and the seventh pilot subcarriers are separated by at least one subcarrier in the frequency domain and the sixth pilot subcarriers and the eighth pilot subcarriers are separated by at least one subcarrier in the frequency domain.

The frame structure may be used in a type of a full usage of subchannels (FUSC) permutation mode. The frame structure may be used in a type of an adaptive modulation and coding (AMC) permutation mode. Preferably, a starting location of the first pilot subcarriers in a first OFDM symbol is offset by 1 subcarrier.

According to an embodiment of the present invention, a wireless communication system using OFDM modulation for downlink and uplink communication includes a MIMO antenna, an OFDM modulator operably connected to the MIMO antenna, and a processor operably connected to the OFDM modulator. The processor is configured to provide a frame structure comprising OFDM symbols in time domain and subcarriers in frequency domain and allocating pilot locations according to equation:

$$P_i = 18k + 9m_i + 3(\lfloor n_s/2 \rfloor \bmod 3)$$

where, $P_i$ denotes pilot index of an $i^{th}$ antenna, k=0, 1, ..., $N_{pilot}$, i=($n_s$+i) mod 2, and $\lfloor n \rfloor$ denotes an integer smaller than n.

According to an embodiment of the present invention, in the wireless communication system using OFDM modulation for downlink and uplink communication and including a MIMO antenna, an OFDM modulator operably connected to the MIMO antenna, and a processor operably connected to the OFDM modulator, the processor is configured to provide a frame structure comprising OFDM symbols in time domain and subcarriers in frequency domain and alternately allocate first pilot subcarriers for a first antenna and second pilot subcarriers for a second antenna in at least one of the time and frequency domains, wherein each of the alternating first pilot subcarriers and the second pilot subcarriers is separated by multiple of a first predetermined number of subcarriers in the frequency domain and further allocated in two contiguous OFDM symbols, wherein the first predetermined number is 9. Preferably, each of the first pilot subcarriers separated by two OFDM symbols is shifted by a second predetermined number of subcarriers, and each of the second pilot subcarriers separated by two OFDM symbols is shifted by the second predetermined number of subcarriers to differentiate frequency selectivity, wherein the second predetermined number is a multiple of 3.

In an aspect of the present invention, the processor includes a subcarrier allocator allocating symbols and pilots to the subcarriers for use in at least one of the downlink and uplink communication. The processor may further include a channel encoder encoding an input stream and building a coded word, a mapper mapping the coded word to a symbol representing a position on signal constellation, and a MIMO processor processing the symbol.

BRIEF DESCRIPTION OF THE DRAWINGS

The accompanying drawings, which are included to provide a further understanding of the invention, illustrate embodiments of the invention and together with the description serve to explain the principle of the invention.

FIGS. 16~18 show some pilot subcarrier allocation structures in a system using eight antennas according to an embodiment of the present invention.

FIGS. 19 and 20 show embodiments of the present invention in which a pilot subcarrier allocation offset varies according to cells in a 4-Tx system and an 8-Tx system.

FIG. 21 shows another embodiment of the 8-Tx system shown in FIG. 20.

FIG. 22 shows a pilot subcarrier allocation pattern according to an embodiment of the present invention.

FIG. 28 shows a pilot subcarrier allocation pattern in a 4-Tx system according to an embodiment of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The following technology may be used in various wireless communication systems. A wireless communication system is widely provided in order to provide various communication services such as voice and packet data. This technology may be used in downlink or uplink. In general, the downlink indicates communication from a base station (BS) to a user equipment (UE) and the uplink indicates communication from the UE to the BS. The BS generally indicates a fixed station communicating with the UE and may also be called a node-B, a base transceiver system (BTS) or an access point. The UE may be fixed or moved and may also be called a mobile station (MS), a user terminal (UT), a subscriber station (SS) or a wireless device.

Hereinafter, an efficient pilot structure for a new system will be described. The new system will be described concentrating on an IEEE 802.16m system, but the same principle may apply to other systems.

A communication system may be a multiple-input multiple-output (MIMO) system or a multiple-input single-output (MISO) system. The MIMO system uses a plurality of transmission antennas and a plurality of reception antennas. The MISO system uses a plurality of transmission antennas and one reception antenna.

Figure 1:
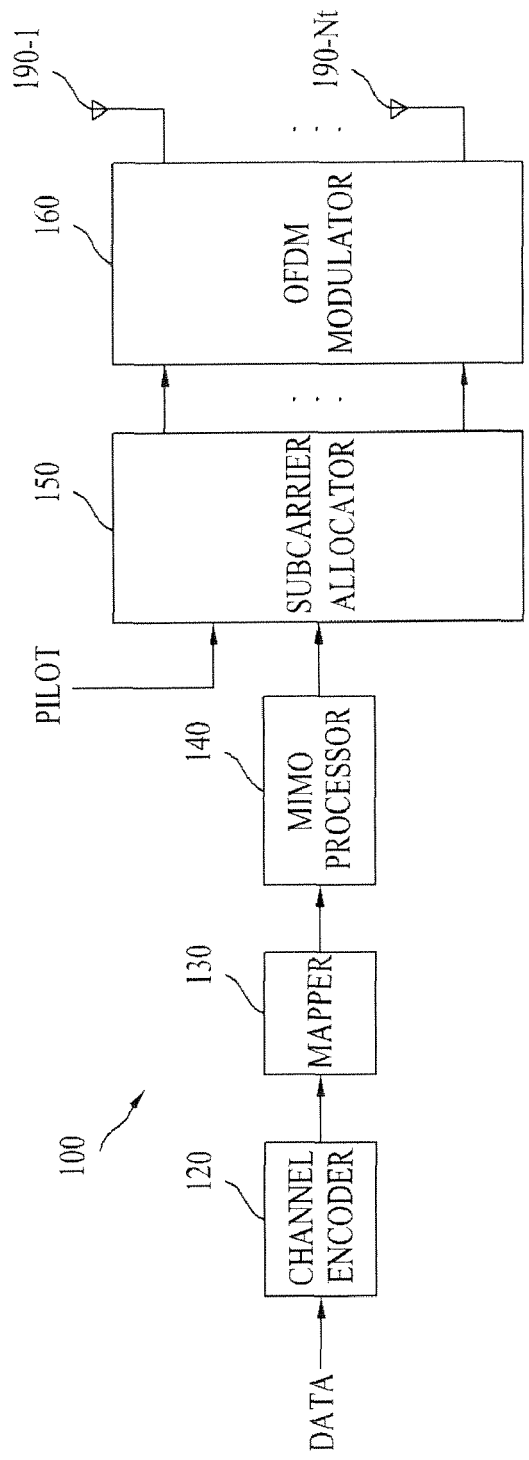
FIG. 1 is a block diagram of a transmitter having multiple antennas.

FIG. 1 is a block diagram of a transmitter having multiple antennas. Referring to FIG. 1, the transmitter 100 includes a channel encoder 120, a mapper 130, an MIMO processor 140, a subcarrier allocator 150 and an orthogonal frequency division multiplexing (OFDM) modulator 160. The channel encoder 120, mapper 130, MIMO processor 140, and subcarrier allocator 150 may be embodied as separate components or combined in a single processor of the transmitter 100.

The channel encoder 120 encodes an input stream according to a predefined coding method and builds a coded word. The mapper 130 maps the coded word to a symbol representing a position on signal constellation. A modulation scheme of the mapper 130 is not restricted and may include an m-phase shift keying (m-PSK) scheme or an m-quadrature amplitude modulation (m-QAM) scheme.

The MIMO processor 140 processes the input symbol by a MIMO method using a plurality of transmission antennas 190-1, . . . , and 190-Nt. For example, the MIMO processor 140 can perform precoding based on codebook.

The subcarrier allocator 150 allocates the input symbol and pilots to subcarriers. The pilots are arranged according to the transmission antennas 190-1, . . . , and 190-Nt. The pilots are known by both the transmitter 100 and a receiver (200 of FIG. 2), which are used for the channel estimation or the data demodulation, and are also called reference signals.

The OFDM modulator 160 modulates the input symbol and outputs OFDM symbols. The OFDM modulator 160 may perform an inverse fast Fourier transform (IFFT) with respect to the input symbol and further insert a cyclic prefix (CP) after performing the IFFT. The OFDM symbols are transmitted via the transmission antennas 190-1, . . . , and 190-Nt.

Figure 2:
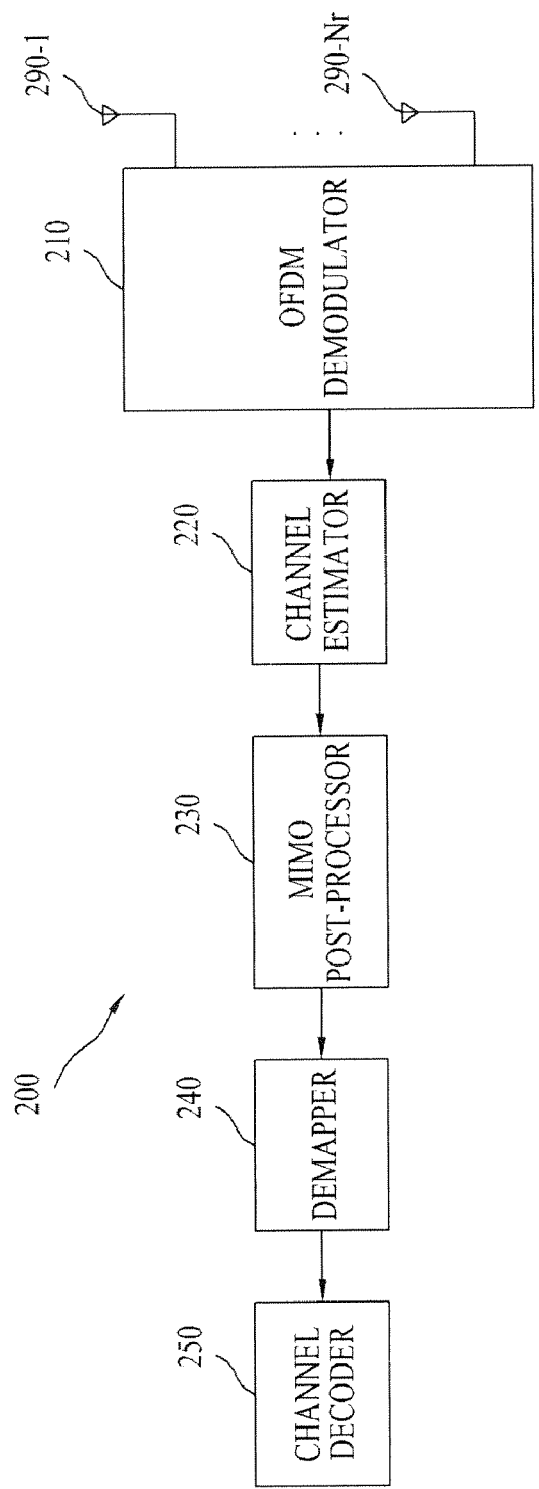
FIG. 2 is a block diagram of a receiver having multiple antennas.

FIG. 2 is a block diagram of a receiver having multiple antennas. Referring to FIG. 2, the receiver 200 includes an OFDM demodulator 210, a channel estimator 220, an MIMO post-processor 230, a demapper 240 and a channel decoder 250. The channel estimator 220, MIMO post-processor 230, demapper 240 and channel decoder 250 may be embodied as separate components or combined in a single processor of the receiver 200.

Signals received via reception antennas 290-1, . . . , and 290-Nr are Fast Fourier transformed (FFT) by the OFDM demodulator 210. The channel estimator 220 estimates channels using pilots. The MIMO post-processor 230 performs a post-process corresponding to the MIMO processor 140. The demapper 240 demaps the input symbol to the coded word. The channel decoder 250 decodes the coded word and restores original data.

Figure 3:
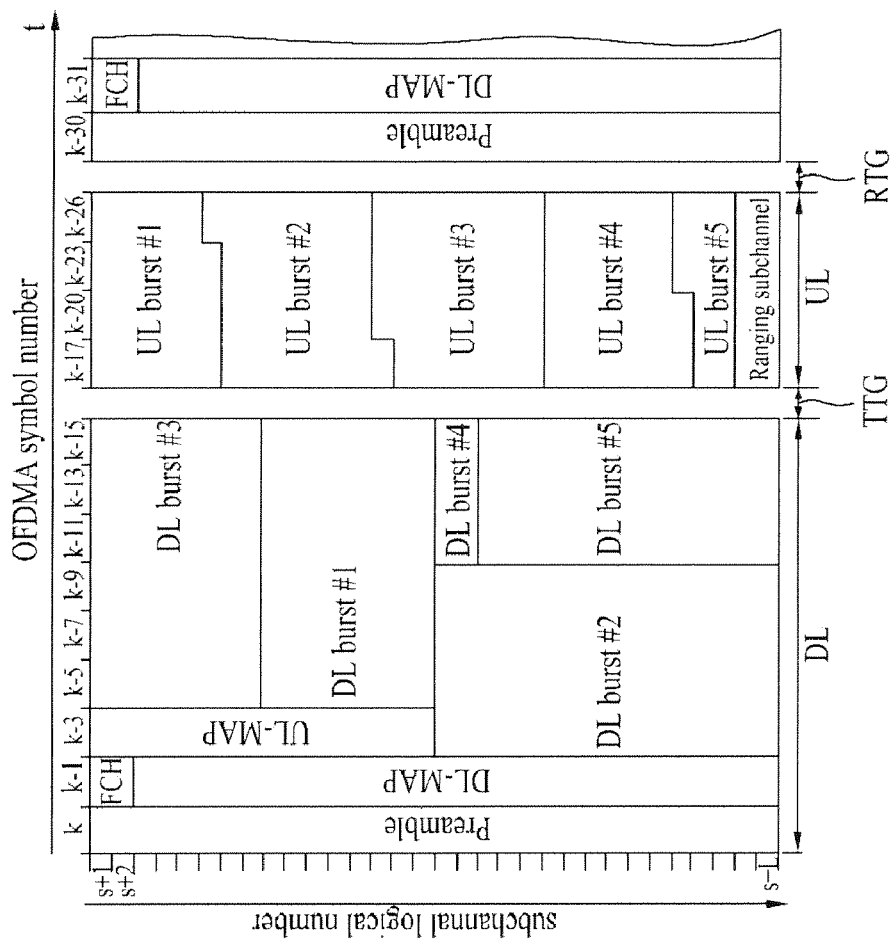
FIG. 3 shows a frame structure.

FIG. 3 is an example of a frame structure. A frame is a data sequence during a fixed time period used by a physical specification, which refers to section 8.4.4.2 of IEEE standard 802.16-2004 "Part 16: Air Interface for Fixed Broadband Wireless Access Systems" (hereinafter, referred to as reference Document 1).

Referring to FIG. 3, the frame includes a downlink (DL) frame and an uplink (UL) frame. Time division duplex (TDD) is a scheme in which the uplink and downlink transmission are separated in time domain but share the same frequency. Normally, the DL frame precedes the UL frame. The DL frame starts in the order of Preamble, Frame Control Header (FCH), Downlink (DL)-MAP, Uplink (UL)-MAP and burst regions (DL burst #1~5 and UL burst #1~5). A guard time for separating the DL frame and the UL frame from each other is inserted at both an intermediate portion of the frame (between the DL frame and the UL frame) and a last portion of the frame (following the UL frame). A transmit/receive transition gap (TTG) is a gap defined between a downlink burst and a subsequent uplink burst. A receive/transmit transition gap (RTG) is a gap defined between an uplink burst and a subsequent downlink burst.

The preamble is used for initial synchronization between the BS and the UE, cell search, frequency offset estimation and channel estimation. The FCH includes information regarding the length of the DL-MAP message and the coding scheme of the DL-MAP. The DL-MAP is a region where the DL-MAP message is transmitted. The DL-MAP message defines the access of a downlink channel. The DL-MAP message includes a configuration change count of a Downlink Channel Descriptor (DCD) and a BS identifier (ID). The DCD describes a downlink burst profile applied to a current frame. The downlink burst profile refers to the property of a downlink physical channel, and the DCD is periodically transmitted by the BS through the DCD message.

The UL-MAP is a region where the UL-MAP message is transmitted. The UL-MAP message defines the access of an uplink channel. The UL-MAP message includes a configuration change count of an Uplink Channel Descriptor (UCD), and an effective start time of the uplink allocation defined by the UL-MAP. The UCD describes an uplink burst profile. The uplink burst profile refers to the property of an uplink physical channel, and the UCD is periodically transmitted by the BS through the UCD message.

Hereinafter, a slot is a minimum data allocation unit and is defined by a time and a subchannel. The number of subchannels depends on a FFT size and time-frequency mapping. The subchannel includes a plurality of subcarriers and the number of subcarriers per subchannel varies according to a permutation method. The permutation indicates mapping of a logical subchannel to a physical subcarrier. The subchannel includes 48 subcarriers in full usage of subchannels (FUSC) and the subchannel includes 24 or 16 subcarriers in partial usage of subchannels (PUSC). A segment indicates at least one subchannel set.

In order to map data to physical subcarriers in a physical layer, two steps are generally performed. In a first step, data is mapped to at least one data slot on at least one logical subchannel. In a second step, the logical subchannel is mapped to the physical subchannel. This is called permutation. Reference document 1 discloses a permutation method such as FUSC, PUSC, Optimal-FUSC (O-FUSC), Optional-PUSC (O-PUSC) and Adaptive modulation and coding (AMC). A set of OFDM symbols using the same permutation method is called a permutation zone and one frame includes at least one permutation zone.

The FUSC and the O-FUSC are used only for the downlink transmission. The FUSC is composed of one segment including all subchannel groups. The subchannels are mapped to the physical subcarriers distributed via all physical channels. The mapping is changed according to OFDM symbols. The slot is composed of one subchannel on one OFDM symbol. The methods of allocating pilots in the O-FUSC and FUSC are different from each other.

The PUSC is used for both the downlink transmission and the uplink transmission. In the downlink, each physical channel is divided into clusters including 14 contiguous subcarriers on two OFDM symbols. The physical channel is mapped in the unit of six groups. In each group, the pilots are allocated to the clusters at fixed positions. In the uplink, the subcarriers are divided into tiles composed of four contiguous physical subcarriers on three OFDM symbols. The subchannel includes six tiles. The pilots are allocated to corners of the tiles. The O-PUSC is used only for the uplink transmission and the tile is composed of three contiguous physical subcarriers on three OFDM symbols. The pilots are allocated to the centers of the tiles.

Figure 4:
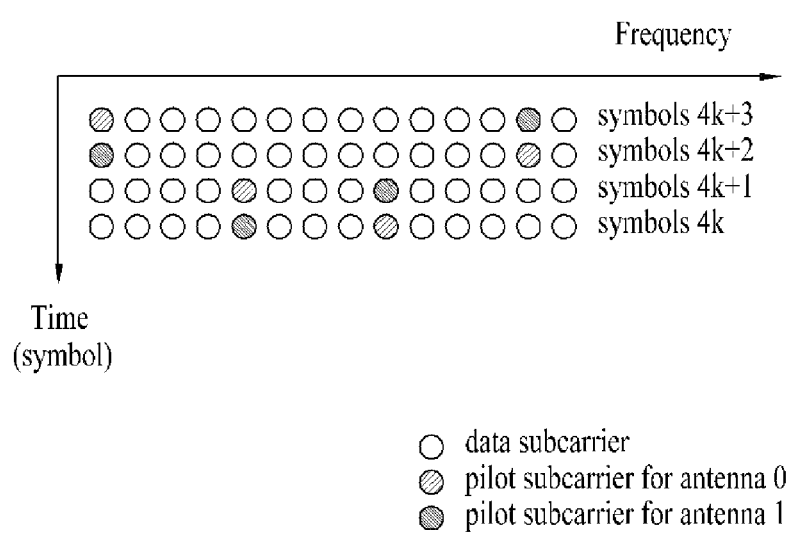
FIG. 4 shows a pilot arrangement of two transmission antennas in partial usage of subchannels (PUSC).
Figure 5:
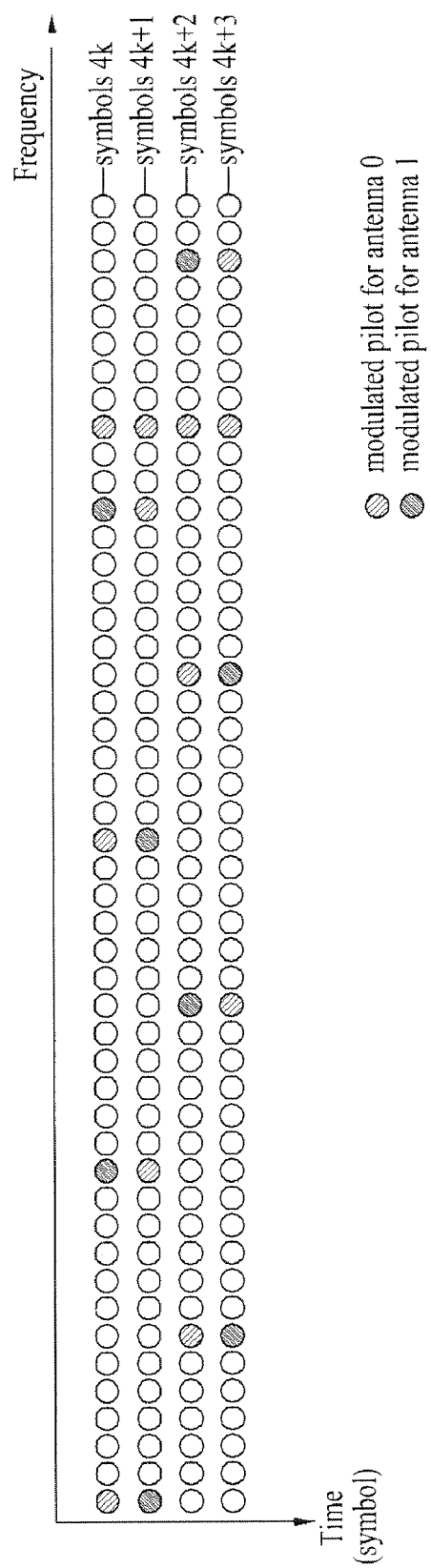
FIG. 5 shows a pilot arrangement of two transmission antennas in full usage of subchannels (FUSC).
Figure 6:
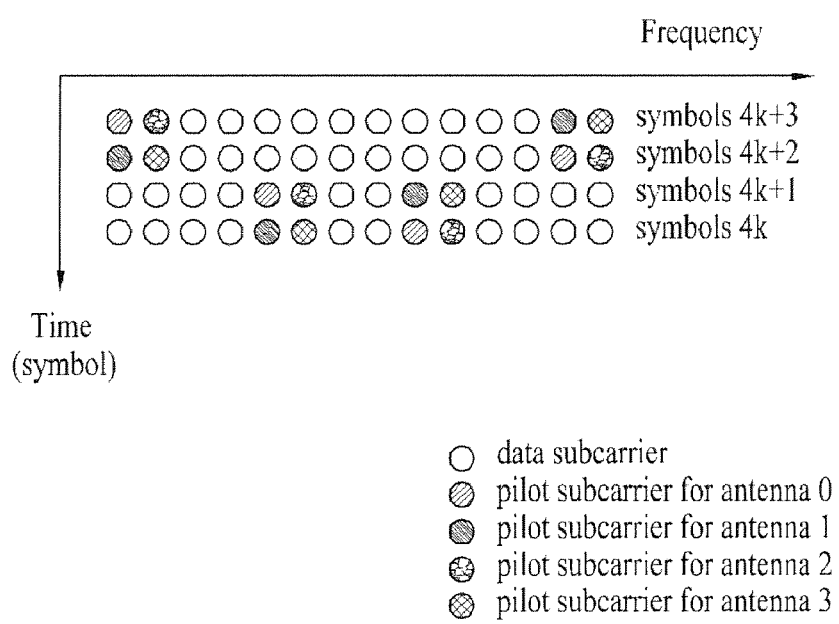
FIG. 6 shows a pilot arrangement of four transmission antennas in the PUSC.
Figure 7:
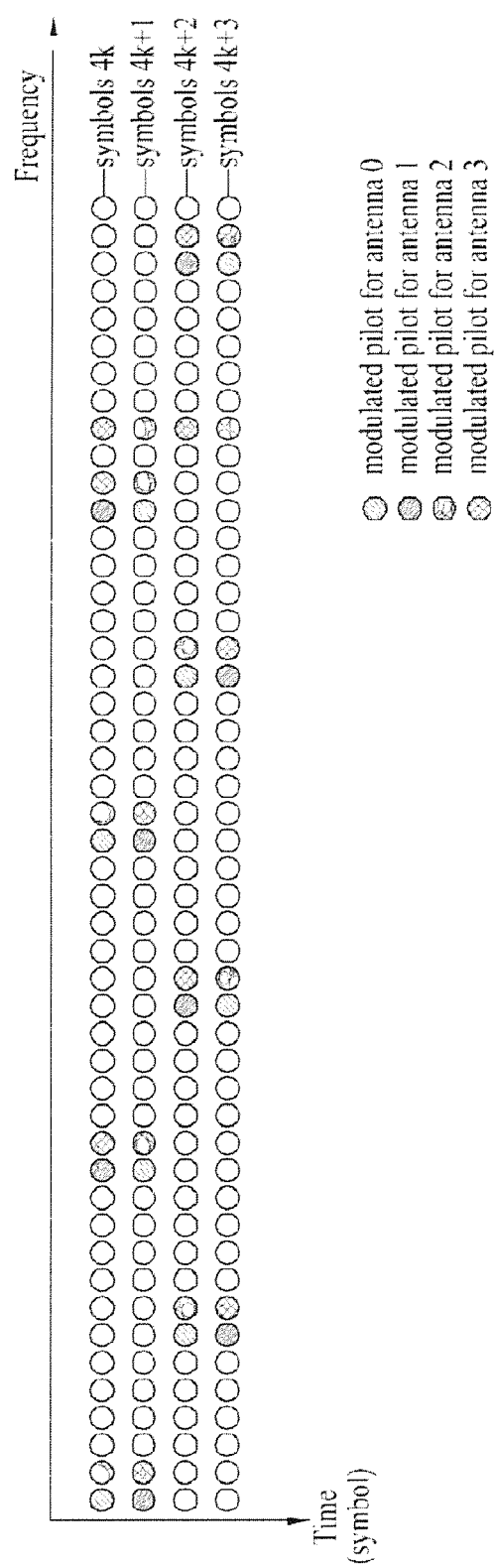
FIG. 7 shows a pilot arrangement of four transmission antennas in FUSC.

FIGS. 4 and 5 show a pilot arrangement of two transmission antennas in the PUSC and FUSC, respectively. FIGS. 6 and 7 show a pilot arrangement of four transmission antennas in the PUSC and FUSC, respectively. They refer to section 8.4.8.1.2.1.1, section 8.4.8.1.2.1.2, section 8.4.8.2.1, and section 8.4.8.2.2 of IEEE standard 802.16-2004/Cor1-2005 "Part 16: Air Interface for Fixed and Mobile Broadband Wireless Access Systems; Amendment 2: Physical and Medium Access Control Layers for Combined Fixed and Mobile Operation in Licensed Bands and Corrigendum 1" (hereinafter, referred to as Reference Document 2).

Referring to FIGS. 4 to 7, pilot overhead is large when the allocation of the subcarrier is performed according to the PUSC or the FUSC. In particular, the overhead is larger when one transmission antenna is used compared to when at least two transmission antennas is used, in consideration of pilot overhead per transmission antenna.

Table 1 shows the pilot overhead according to the number of transmission antennas in each permutation method.

TABLE 1

| Number of transmission antennas | PUSC | FUSC | O-FUSC |
| --- | --- | --- | --- |
| 1 | 14.28% (14.28%) | 9.75% (9.75%) | 11.1% (11.1%) |
| 2 | 14.28% (7.14%) | 9.75% (4.78%) | 11.1% (5.55%) |
| 4 | 28.55% (7.14%) | 18.09% (4.52%) | 22.21% (5.55%) |

The pilot overhead is a value obtained by dividing the number of subcarriers allocated to the pilots by the number of all subcarriers which are used. The value in parenthesis indicates the pilot overhead per transmission antenna. Further, according to Reference Document 2, if four or three transmission antennas are used, mapping of the data to the subchannels is performed after puncturing or truncation with respect to channel encoded data.

Now, a pilot structure for multiple antennas according to the present invention will be described. Design criteria for an optimal pilot structure are as follows.

(1) The pilot overhead in a single antenna is about 4 to 9% in a time-frequency domain. (2) One slot may include 48 subcarriers on two contiguous OFDM symbols. (3) The pilot subcarriers are uniformly distributed in the time-frequency domain. (4) The pilot overhead per transmission antenna is similarly maintained and the total pilot overhead is increased as the number of transmission antennas is increased. In consideration of the total pilot overhead, the total pilot overhead is equally maintained so as not to exceed 20% in at least three transmission antennas.

(5) Even when the number of transmission antennas is increased, mapping of the data to the subchannels is not influenced.

In order to derive a possible candidate group using the above-described condition, the following requirements can be expressed by equations and the candidate group satisfying the requirements can be derived.

$$(N\text{used} - 2*Np) \bmod N\text{sub} = 0 \quad (1)$$

$$(N\text{used} - 2*Np) \bmod N\text{sub} = 0 \quad (2)$$

$$(N\text{used} - Np) \bmod N\text{sub} = 0 \quad (3)$$

$$0.04 <= Np <= 0.09 \quad (4)$$

$$Ng = N\text{fft} - N\text{used} - 1(\text{DC subcarrier}) \quad (5)$$

$$(N\text{used} - Np)/N\text{sub.sym} >= N\text{sch.pusc} \quad (6)$$

where, Nused denotes the number of used subcarriers, Np denotes the number of pilot subcarriers, Ng denotes the number of guard subcarriers, Nfft denotes a FFT size, Nsub denotes the number of subcarriers per subchannel, Nsub.sym denotes the number of subcarriers allocated to the subchannel on one OFDM symbol, and Nsch.pusc denotes the number of subchannels which can be generated in the existing DL-PUSC.

Table 2 shows 26 candidate groups according to the design criteria.

TABLE 2

| # | FFT Size | Used SCs | Pilot SCs | Guard SCs | # of Subch - 1 antenna | # of Subch - 2 antennas | # of Subch - 4 antennas | Pilot Overhead - 1 antenna | Data Ratio | Guard Ratio | Pilot Spacing |
|---|---|---|---|---|---|---|---|---|---|---|---|
| (1) | 2048 | 1656 | 72 | 391 | 66 | 63 | 60 | 4.3478 | 80.859 | 19.092 | 11.5 |
| (2) | 2048 | 1656 | 96 | 391 | 65 | 61 | 57 | 5.7971 | 80.859 | 19.092 | 8.625 |
| (3) | 2048 | 1680 | 72 | 367 | 67 | 64 | 61 | 4.2857 | 82.031 | 17.92 | 11.6667 |
| (4) | 2048 | 1680 | 96 | 367 | 66 | 62 | 58 | 5.7143 | 82.031 | 17.92 | 8.75 |
| (5) | 2048 | 1680 | 120 | 367 | 65 | 60 | 55 | 7.1429 | 82.031 | 17.92 | 7 |
| (6) | 2048 | 1704 | 72 | 343 | 68 | 65 | 62 | 4.2254 | 83.203 | 16.748 | 11.833 |
| (7) | 2048 | 1704 | 96 | 343 | 67 | 63 | 59 | 5.6338 | 83.203 | 16.748 | 8.875 |
| (8) | 2048 | 1704 | 120 | 343 | 66 | 61 | 56 | 7.0423 | 83.203 | 16.748 | 7.1 |
| (9) | 2048 | 1728 | 72 | 319 | 69 | 66 | 63 | 4.1667 | 84.375 | 15.576 | 12 |
| (10) | 2048 | 1728 | 96 | 319 | 68 | 64 | 60 | 5.5556 | 84.375 | 15.576 | 9 |
| (11) | 2048 | 1728 | 120 | 319 | 67 | 62 | 57 | 6.9444 | 84.375 | 15.576 | 7.2 |
| (12) | 2048 | 1728 | 144 | 319 | 66 | 60 | 54 | 8.3333 | 84.375 | 15.576 | 6 |
| (13) | 2048 | 1752 | 72 | 295 | 70 | 67 | 64 | 4.1096 | 85.547 | 14.404 | 12.1667 |
| (14) | 2048 | 1752 | 96 | 295 | 69 | 65 | 61 | 5.4795 | 85.547 | 14.404 | 9.125 |
| (15) | 2048 | 1752 | 120 | 295 | 68 | 63 | 58 | 6.8493 | 85.547 | 14.404 | 7.3 |
| (16) | 2048 | 1752 | 144 | 295 | 67 | 61 | 55 | 8.2192 | 85.547 | 14.404 | 6.08 |
| (17) | 2048 | 1776 | 72 | 271 | 71 | 68 | 65 | 4.0541 | 86.719 | 13.232 | 12.333 |
| (18) | 2048 | 1776 | 96 | 271 | 70 | 66 | 62 | 5.4054 | 86.719 | 13.232 | 9.25 |
| (19) | 2048 | 1776 | 120 | 271 | 69 | 64 | 59 | 6.7568 | 86.719 | 13.232 | 7.4 |
| (20) | 1024 | 816 | 48 | 207 | 32 | 30 | 28 | 5.8824 | 79.688 | 20.215 | 8.5 |
| (21) | 1024 | 840 | 48 | 183 | 33 | 31 | 29 | 5.7143 | 82.031 | 17.871 | 8.75 |
| (22) | 1024 | 864 | 48 | 159 | 34 | 32 | 30 | 5.5556 | 84.375 | 15.527 | 9 |
| (23) | 1024 | 864 | 72 | 159 | 33 | 30 | 27 | 8.3333 | 84.375 | 15.527 | 6 |
| (24) | 1024 | 888 | 48 | 135 | 35 | 33 | 31 | 5.4054 | 86.719 | 13.184 | 9.25 |
| (25) | 1024 | 888 | 72 | 135 | 34 | 31 | 28 | 8.1081 | 86.719 | 13.184 | 6.1665 |
| (26) | 512 | 432 | 24 | 79 | 17 | 16 | 15 | 5.5556 | 84.375 | 15.43 | 9 |

The used subcarriers (used SCs), the pilot subcarriers (Pilot SCs) and the guard subcarriers (Guard SCs) are obtained according to the FFT size, and the subchannel according to the number of transmission antennas is obtained. The used subcarrier is a value excluding a DC subcarrier. For example, in the case (1), the number of subchannels in one transmission antenna is (the number of used subcarriers−the number of pilot subcarriers)/(the number of subcarriers allocated to the subchannels on one OFDM symbol)=1656−72/24=66.

Figure 8:
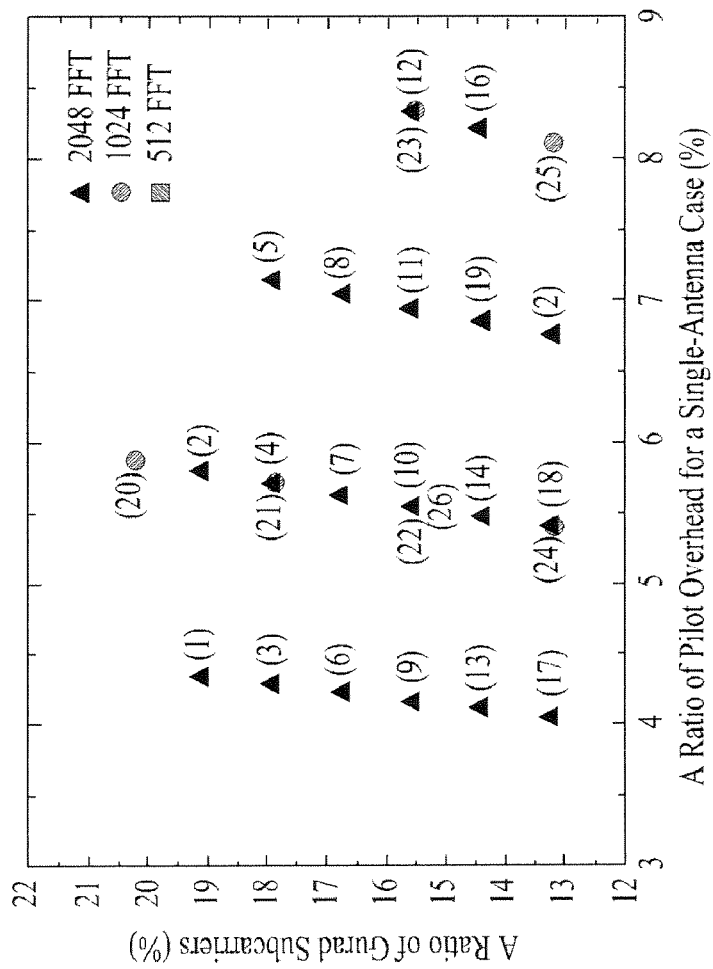
FIG. 8 is a graph showing cases of Table 2 by a ratio of pilot overhead and a ratio of guard subcarriers.

FIG. 8 is a graph showing cases of Table 2 by a ratio of pilot overhead and a ratio of guard subcarriers. Referring to FIG. 8, among cases (1) to (26) shown in Table 2, in consideration of the system bandwidth or the FFT size, it can be seen that cases which are most suitable for 5 to 20 MHz or 512 to 2048 FFT size in the same design criteria are cases (10), (22) and (26). In Table 2, the cases (10), (22) and (26) have a spacing of 9 pilots. That is, in one embodiment of the present invention, the arrangement of the pilots at a spacing of 9 subcarriers is provided.

Table 3 shows the subcarrier allocation.

The subchannels are mapped to subcarriers excluding the subcarriers used after allocating the pilot subcarriers. At this time, a general PUSC or FUSC permutation method is applicable.

According to the above mentioned method, it is possible to improve throughput by 6 to 13% in the PUSC/FUSC. For example, while 60 subchannels can be obtained in the PUSC and 64 subchannels can be obtained in the FUSC according to the prior art, 68 subchannels can be obtained according to the above mentioned method. If a new permutation method is applied in consideration of the multiple antennas, capability can be prevented from deteriorating due to data puncturing or truncation.

The equation shown in the pilot subcarrier index of Table 3 represents a pilot index Pi of an $i^{th}$ antenna. This is expressed by the following equation again.

$$P_i = 18k + 9m_i + 3(\lfloor n_s/2 \rfloor \bmod 3) \quad \text{Equation 1}$$

where, k=0, 1, ..., Npilot, mi=(ns+i) mod 2, i=0, 1, $\lfloor n \rfloor$ denotes an integer smaller than n. In Equation 1, a factor "18"

TABLE 3

| Parameter | Value 2048 | Value 1024 | Value 512 | Comments |
|---|---|---|---|---|
| # of DC Subcarriers | 1 | 1 | 1 | Index 1024/512/256 (counting from 0) |
| # of Guard Subcarriers, Left | 160 | 80 | 40 | — |
| # of Guard Subcarriers, Right | 159 | 79 | 39 | — |
| # of Used Subcarriers ($N_{used}$) | 1729 | 865 | 433 | Number of all subcarriers used within a symbol, including pilots & a DC carrier |
| # of Pilot Subcarriers ($N_{pilot}$) | 96 | 48 | 24 | — |
| Pilot Subcarrier Index | 18k + 9m$_i$ + 3($\lfloor$n$_s$/2$\rfloor$mod 3) k = 0, 1, ..., N$_{pilot}$ m$_i$ = (n$_s$ + i) mod 2, i = 0, 1 | | | n$_s$ denotes a symbol index, in which index '0' should be the first symbol of the current zone. DC carrier is excluded for the calculation of the pilot subcarrier index. |
| # of Data Subcarriers (in each symbol per subch.) | 1632 (24) | 816 (24) | 408 (24) | — | indicates that the number of subcarriers of the subchannel on one OFDM symbol is 18, a factor "9" indicates that the pilot subcarriers are arranged at a spacing of 9 subcarriers, and a factor "3" indicates that the subcarriers are shifted at a spacing of three subcarriers in the unit of a slot. In this case, each slot occupies 2 consecutive OFDM symbols in time domain.

Figure 9:
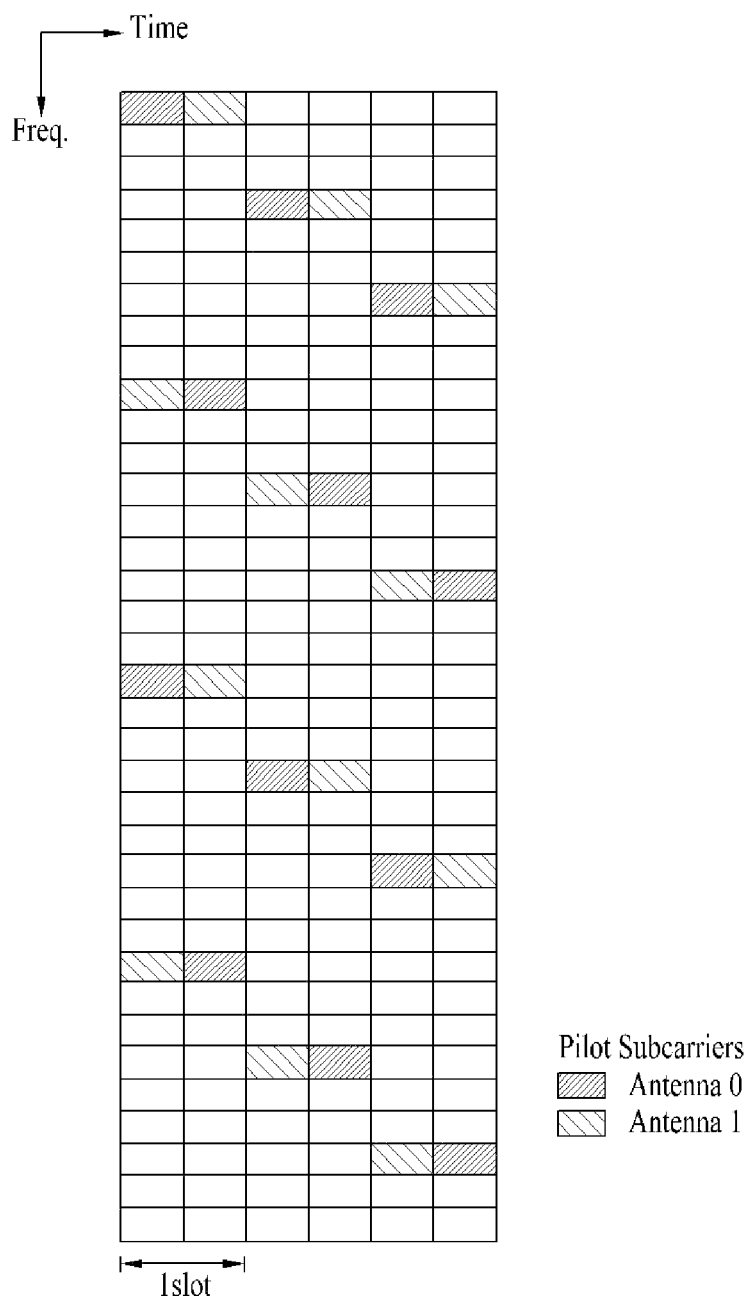
FIG. 9 shows the pilot arrangement of the two transmission antennas.

FIG. 9 is an example of the pilot arrangement of two transmission antennas. Referring to FIG. 9, one slot includes 72 subcarriers on two contiguous OFDM symbols, and the pilot subcarriers for a first antenna (antenna 0) and the pilot subcarriers for a second antenna (antenna 1) are arranged at a spacing of 9 subcarriers on each OFDM symbol. In addition, on the first OFDM symbol and the second OFDM symbol, the pilot subcarriers for the first antenna (antenna 0) and the pilot subcarriers for the second antenna (antenna 1) are alternately arranged.

In a second slot, the pilot subcarriers are shifted from the pilot subcarriers allocated to the first slot by three subcarriers. In a third slot, the pilot subcarriers are shifted from the pilot subcarriers allocated to the second slot by three subcarriers. As a result, the same pilot arrangement is repeated in every three slots.

In the pilot arrangement, the pilots can be moved at a constant spacing in the time domain or the frequency domain, and thus, do not have absolute positions. The pilot subcarriers may be shifted by at a constant time interval or/and a subcarrier spacing while a spacing between the pilot subcarriers is maintained.

Figure 10:
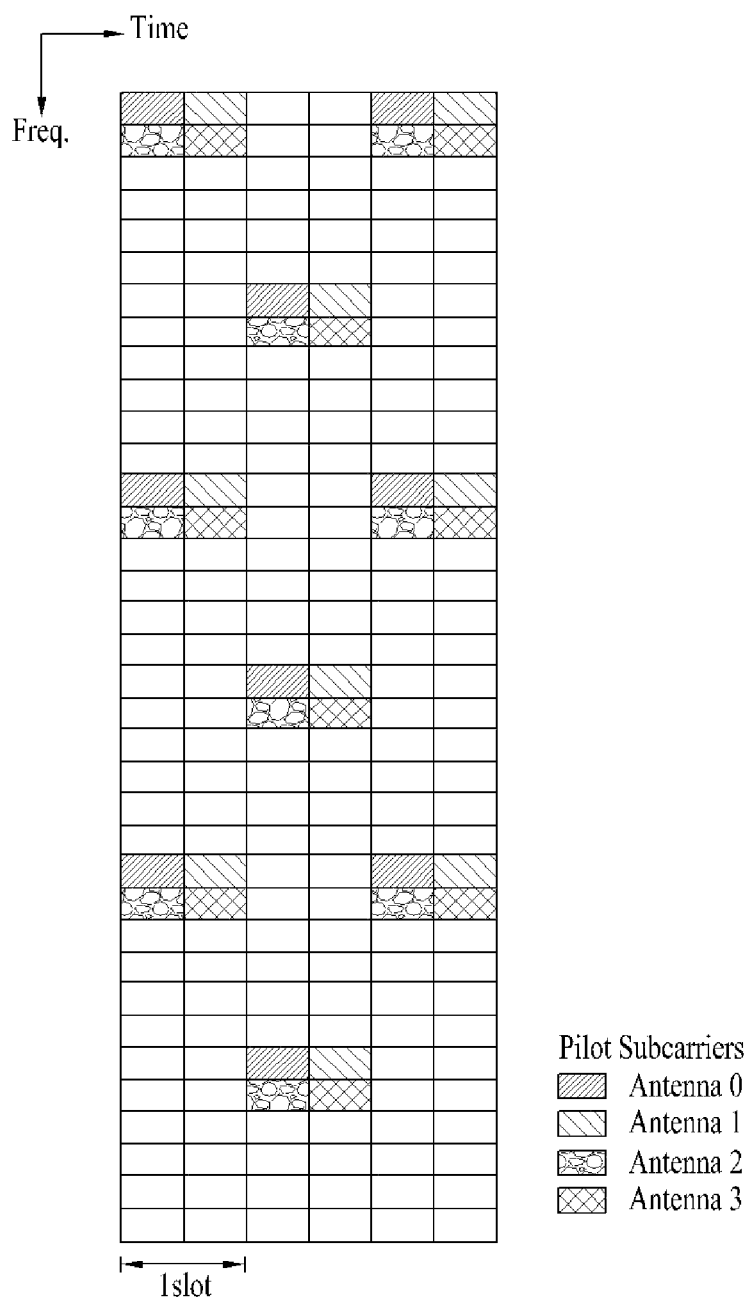
FIG. 10 shows the pilot arrangement of the four transmission antennas.

FIG. 10 is an example of the pilot arrangement of four transmission antennas. Referring to FIG. 10, the pilot subcarriers for four transmission antennas (antenna 0, antenna 1, antenna 2, and antenna 3) are contiguous in the frequency domain or in the time domain. The pilot subcarriers for the transmission antennas are arranged at a spacing of 12 subcarriers.

In a second slot, the pilot subcarriers are shifted from the pilot subcarriers allocated to the first slot by six subcarriers. As a result, the same pilot arrangement is repeated every two slots.

In the four transmission antennas, since the number of pilots is larger than the number of the two transmission antennas, the pilot spacing is wider than the pilot spacing in the two transmission antennas and the cyclic period of the repeated slot is decreased.

Figure 11:
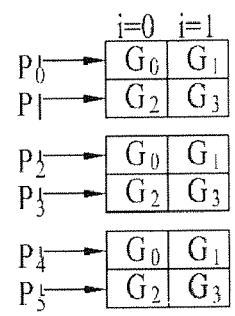
FIG. 11 illustrates the pilot arrangement of three or four transmission antennas by equation.

FIG. 11 illustrates the pilot arrangement of three or four transmission antennas by equation. Referring to FIG. 11, $G_0$, $G_1$, $G_2$, and $G_3$ are defined in a 2×2 region including two OFDMs (i=0, 1) and two subcarriers. For example, in the four transmission antennas, the pilot carriers are arranged as shown in Table 4, which is equal to the arrangement of FIG. 10.

TABLE 4

| | Antenna 0 | Antenna 1 | Antenna 2 | Antenna 3 |
|---|---|---|---|---|
| Pilot Subcarrier Index | $G_0$ | $G_1$ | $G_2$ | $G_3$ |

In the three transmission antennas, the pilot subcarriers are arranged as shown in Table 5.

TABLE 5

| $\lfloor n_2/2 \rfloor \bmod 2$ | | 0 | 1 | 2 |
|---|---|---|---|---|
| Pilot Subcarrier Index | Antenna 0 | $G_0, G_3$ | $G_2$ | $G_1$ |
| | Antenna 1 | $G_1$ | $G_0, G_3$ | $G_2$ |
| | Antenna 2 | $G_2$ | $G_1$ | $G_0, G_3$ |

In order to express the pilot arrangement for the four transmission antennas by equation, six pilot subcarriers $P^i_0$, $P^i_1$, $P^i_2$, $P^i_3$, $P^i_4$, and $P^i_5$ are considered on OFDM symbols (i=0, 1), as shown in Table 6.

TABLE 6

| | $m_i = 0$ | $m_i = 1$ |
|---|---|---|
| k = even | $P^i_0 = \{\text{PilotSub}(k, m_i)\}$<br>$P^i_2 = \{\text{PilotSub}(k, m_i) + 1\}$ | $P^i_2 = \{\text{PilotSub}(k, m_i) + 3\}$ |
| k = odd | $P^i_3 = \{\text{PilotSub}(k, m_i) - 5\}$ | $P^i_4 = \{\text{PilotSub}(k, m_i) - 3\}$<br>$P^i_5 = \{\text{PilotSub}(k, m_i) - 2\}$ | where, $\text{PilotSub}(k,m_i)=18k+9m_i+6(\lfloor n_s/2 \rfloor \bmod 2)$.

Accordingly, in one slot, a pilot subcarrier set may be mapped to the four pilot subcarriers $G_0$, $G_1$, $G_2$, and $G_3$ as shown in Equation 2.

$$G_i = P^i_0 + P^i_2 + P^i_4 \text{ and } G_{i+2} = P^i_1 + P^i_3 + P^i_5$$

where, i=0, 1.

According to the pilot structure, the pilot overhead satisfying the design criteria is obtained and the overhead is decreased from the prior art by 5% or more. The pilot overhead is 5.55% in the two transmission antennas, 5.55% in the three transmission antennas, and 4.16% in the four transmission antennas.

Even when the number of transmission antennas is increased, the mapping of data to the subchannels is not influenced. Accordingly, the permutation method can be simply performed.

In a method of generating distributed subchannels used in the existing IEEE 802.16-2004 standard, pilot subcarriers for the first antenna and the second antenna are first allocated and subchannels are constructed using residual subcarriers. In a third antenna and a fourth antenna, since the pilot subcarriers are allocated and used using the allocated subchannels, the subchannels of the same number are constructed regardless of the number of antennas. However, according to the pilot structure, a necessary number of pilot subcarriers are allocated according to the number of antennas and the subchannels are constructed using the residual subcarriers. Accordingly, the number of subchannels is increased while optimizing the pilot overhead.

Figure 12:
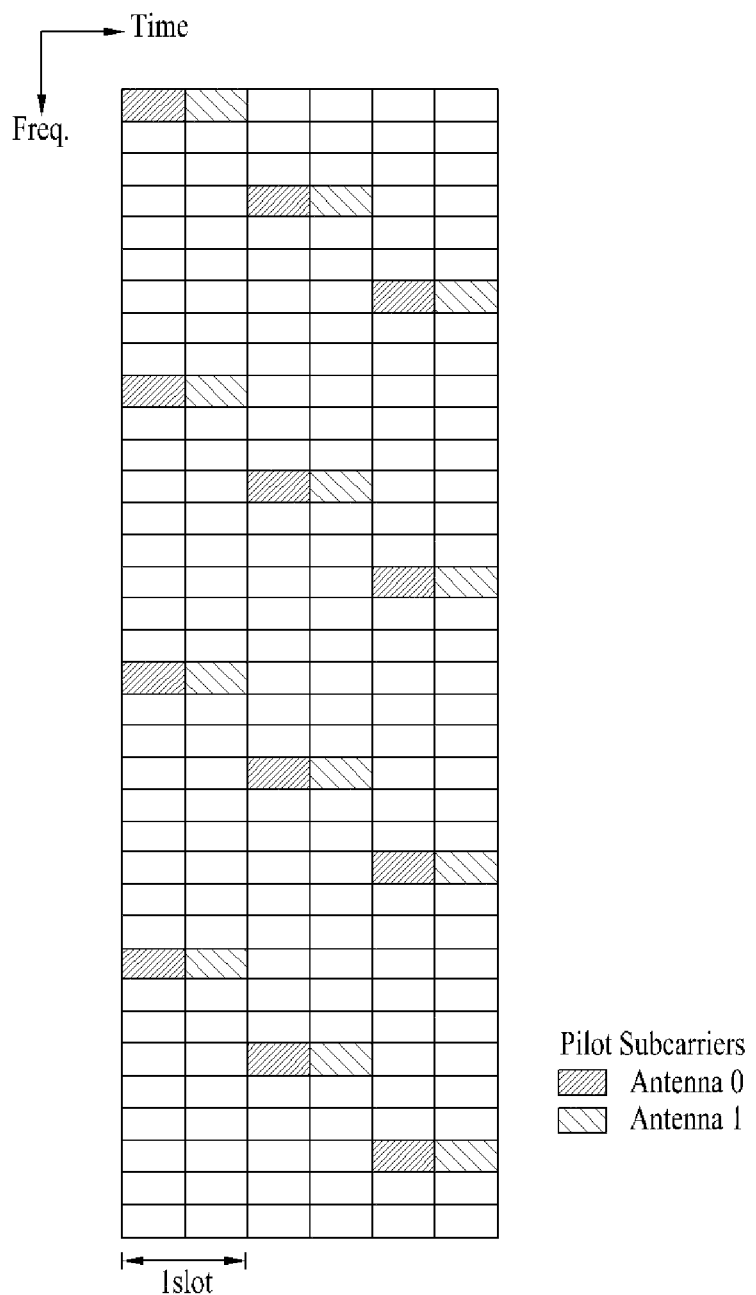
FIG. 12 shows the pilot arrangement of the two transmission antennas.

FIG. 12 is another example of the pilot arrangement of two transmission antennas. Referring to FIG. 12, the pilot subcarriers for one antenna are arranged on one OFDM symbol at a spacing of nine subcarriers. That is, the pilot subcarriers for the first antenna (antenna 0) are arranged on the first OFDM symbol at a spacing of nine subcarriers, and the pilot subcarriers for the second antenna (antenna 1) are arranged on the second OFDM symbol at a spacing of nine subcarriers.

In a second slot, the pilot subcarriers are arranged by shifting the pilot subcarriers allocated to the first slot by three subcarriers. In a third slot, the pilot subcarriers are arranged by shifting the pilot subcarriers allocated to the second slot by three subcarriers. As a result, the same pilot arrangement is repeated every three slots.

Figure 13:
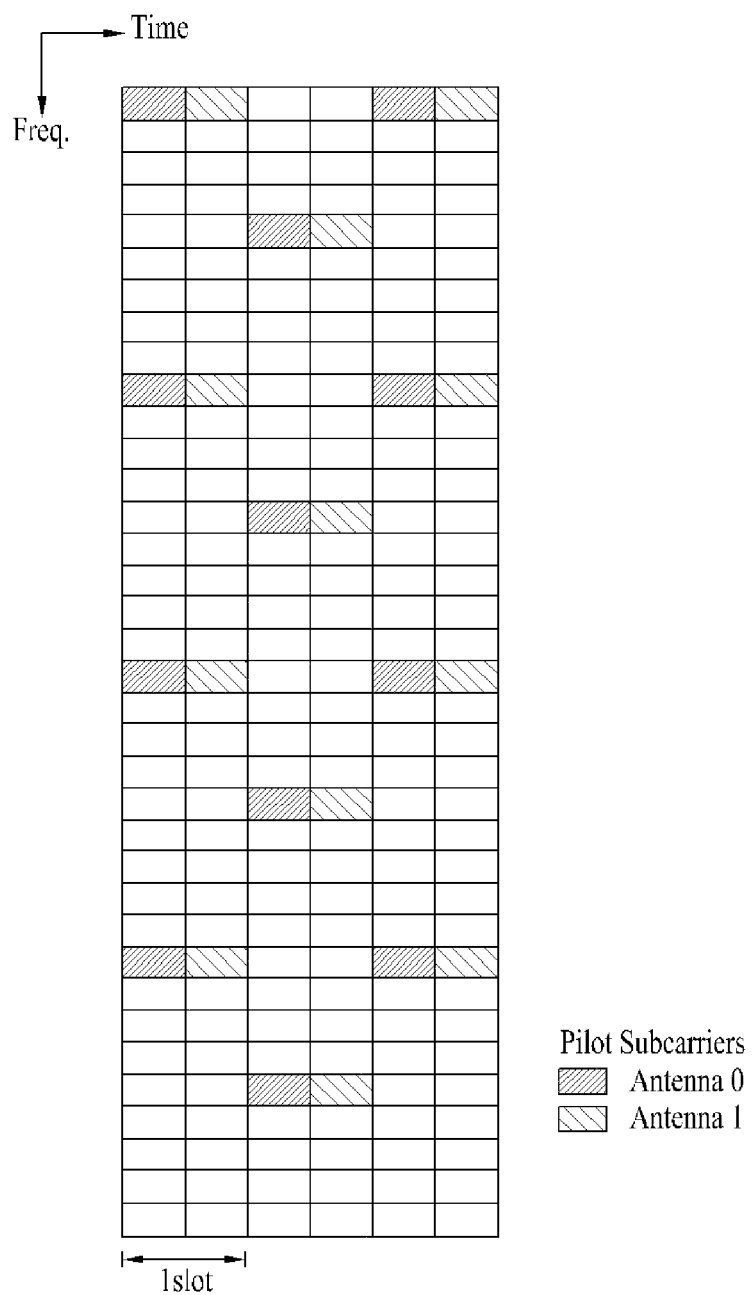
FIG. 13 shows the pilot arrangement of the two transmission antennas.

FIG. 13 is another example of the pilot arrangement of two transmission antennas. Referring to FIG. 13, the arrangement of the pilot subcarriers in one slot is equal to that of the embodiment shown in FIG. 9. However, in a second slot, the pilot subcarriers are shifted from the pilot subcarriers by four subcarriers. As a result, the same pilot arrangement is repeated every two slots.

Figure 14:
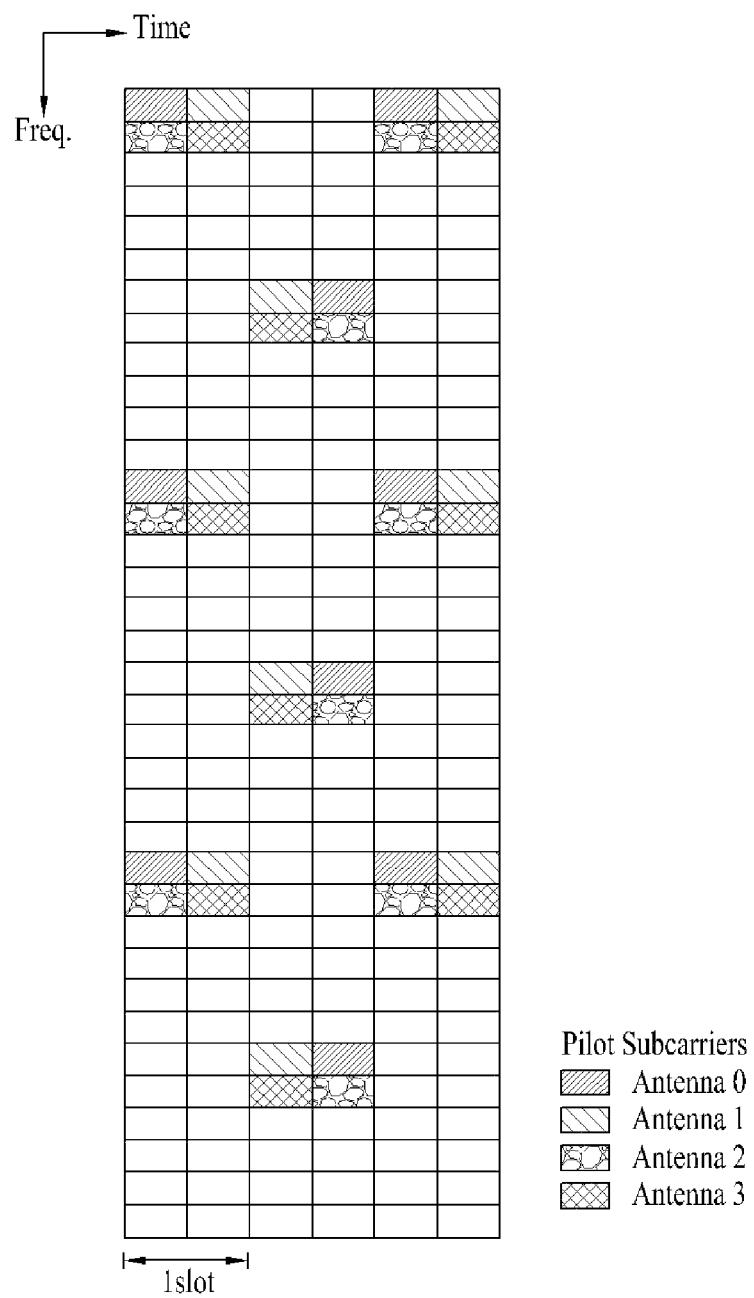
FIG. 14 shows the pilot arrangement of the four transmission antennas.

Referring to FIG. 14, the pilot subcarriers for the transmission antennas (antenna 0, antenna 1, antenna 2, and antenna 3) are arranged at a spacing of 12 subcarriers and are arranged by shifting the frequency position in the unit of two OFDM symbols in every slot. In a second slot, the pilot subcarriers are shifted from the pilot subcarriers allocated to the first slot by six subcarriers. As a result, the same pilot arrangement is repeated every two slots.

Figure 15:
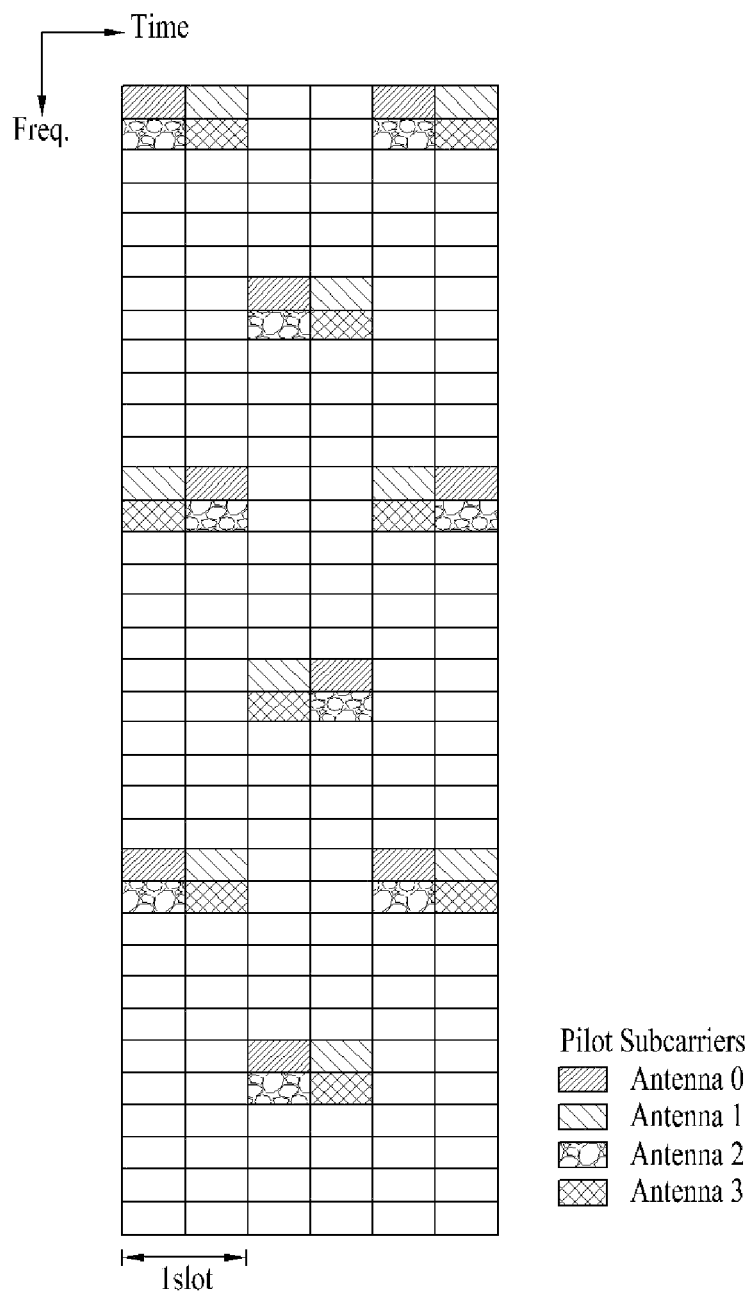
FIG. 15 shows the pilot arrangement of the four transmission antennas.

FIG. 15 is another example of the pilot arrangement of four transmission antennas (antenna 0, antenna 1, antenna 2, and antenna 3). Referring to FIG. 15, the pilot subcarriers for the transmission antennas are arranged at a spacing of 12 subcarriers and the pilot subcarriers for the antennas are alternately arranged between two subsequent OFDM symbols in one slot. By alternately arranging 2 pilot subcarriers in two subsequent OFDM symbols, that is, by equally allocating each of pilot subcarriers for each antenna in 1 OFDM symbol, transmission power for each antenna can be balanced in certain time instance. In FIG. 15, two pilot subcarriers for respective two antennas are paired, and each of the two pairs of pilot subcarriers are alternatively allocated in two OFDM symbols.

Hereinafter, an efficient pilot allocation structure according to an embodiment of the present invention is described. A structure for allocating the pilot subcarriers efficiently shifts the pilot structure between contiguous cells in order to avoid collision between pilot subcarriers.

In the following embodiment of the present invention, as an example, a basic resource block unit is composed of 18 subcarriers (vertical axis)*six OFDM symbols (horizontal axis). However, the method of allocating the pilot subcarriers according to the present invention is also applicable to other basic resource block units by expanding the same method to a subframe or a frame.

In the following embodiment, the horizontal axis denotes a set of OFDM symbols in the time domain and the vertical axis denotes the subcarriers in the frequency domain. P1, P2, P3, P4, P5, P6, P7 and P8 denote the pilot subcarriers corresponding to the antennas 1, 2, 3, 4, 5, 6, 7 and 8, respectively.

Figure 16:
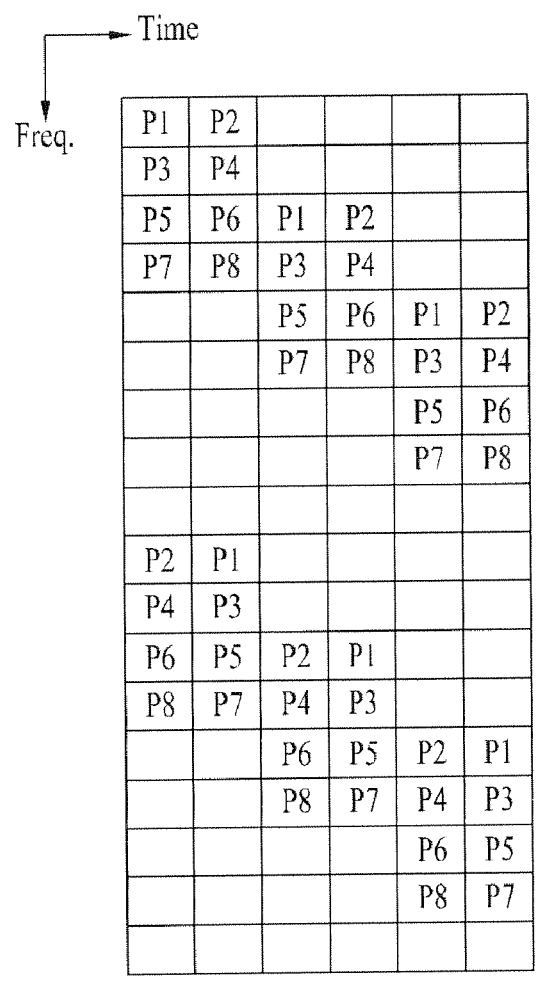

FIGS. 16~18 are pilot subcarrier allocation structures in a system using eight antennas according to an embodiment of the present invention. The pilots of the first transmission antenna (P1) and the pilots of the second transmission antenna (P2), the pilots of the third transmission antenna (P3) and the pilots of the fourth transmission antennas (P4), the pilots of the fifth transmission antenna (P5) and the pilots of the sixth transmission antennas (P6), and the pilots of the seventh transmission antenna (P7) and the pilots of the eighth transmission antennas (P8) are respectively paired with each other and allocated so as to be contiguous to each other on two OFDM symbols, as shown in FIGS. 16~18. Further, the structure for consecutively allocating the pilot subcarriers for the antennas at a spacing of 18 subcarriers in the frequency axis is provided. That is, the pilot subcarriers are allocated at a spacing of a subchannel including 18 subcarriers.

Specifically, FIG. 16 shows a pilot pattern shifted and allocated at the subcarrier spacing of 2 per unit of two OFDM symbols. FIG. 17 shows a pilot pattern shifted and allocated at the subcarrier spacing of 6 per unit of two OFDM symbols. FIG. 18 shows a pilot pattern shifted and allocated at the subcarrier spacing of 6 per unit of two OFDM symbols, as in FIG. 17, but having additional 1 subcarrier offset.

In an aspect of the present invention, the pilot subcarriers for the antennas are equally allocated in each OFDM symbol, and the pilot subcarrier pattern is shifted and allocated at a predetermined spacing in a unit of two OFDM symbols. In another aspect of the present invention, the pilots for eight transmission antennas may be allocated to be shifted by a predetermined subcarrier spacing per each of the pilots for the antennas or pilot subcarrier pairs, instead of being contiguously allocated, as shown in FIGS. 16~18.

The pilot allocation may have the same allocation structure regardless of a regular subframe or an irregular subframe. A part of the pilots allocated according to an embodiment of the present invention may be used in a common pilot and the other part thereof may be used in a dedicated pilot. All the allocated pilots may be applied to the dedicated pilot or the common pilot. This embodiment is characterized in that the pilots for all antennas are equally allocated in one OFDM symbol for power balancing of the antenna per OFDM symbol. In the method of allocating the pilot subcarriers according to the above-described embodiment, a shift offset for pilot allocation may vary according to cells.

Figure 19:
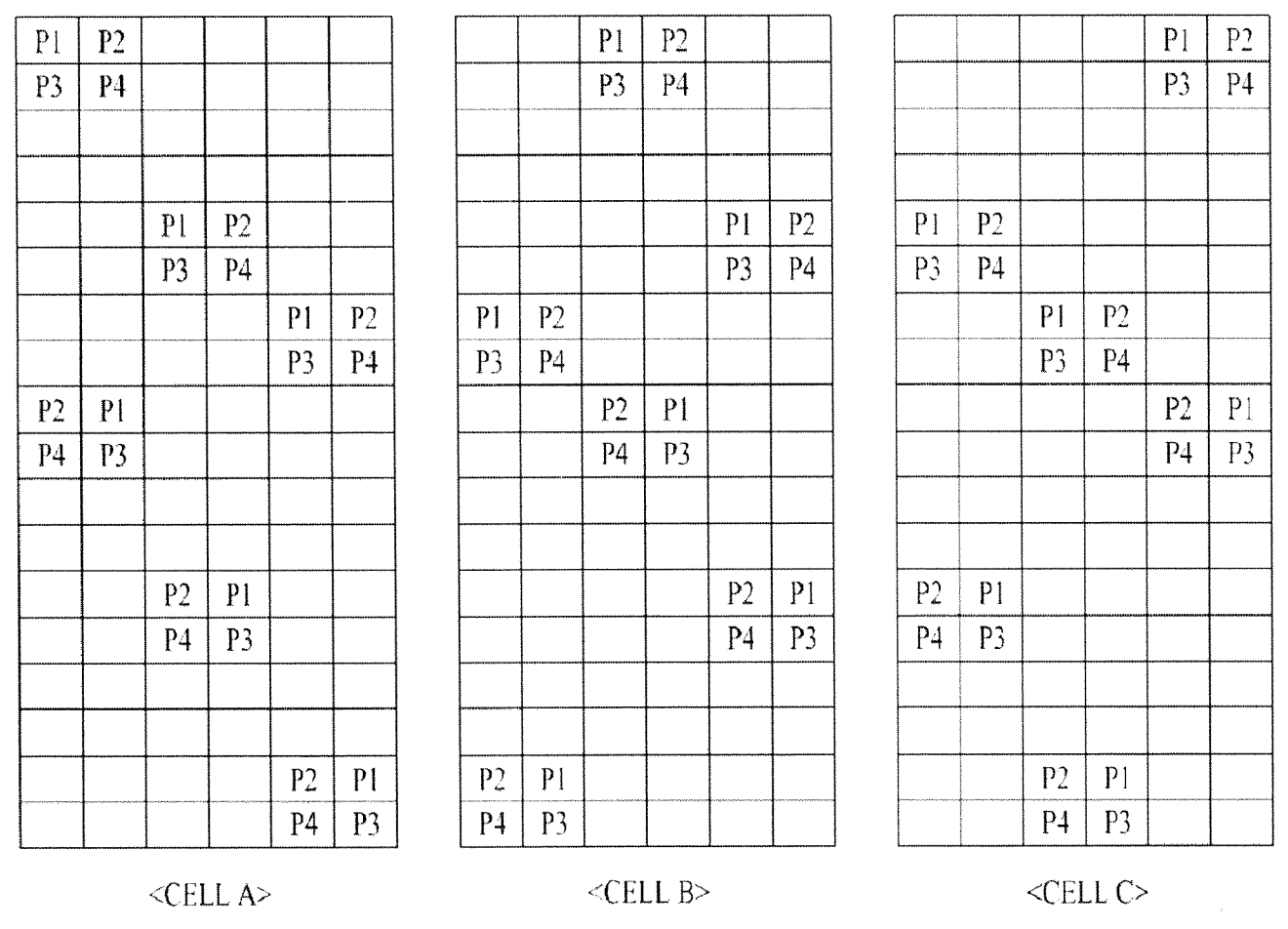
Figure 20:
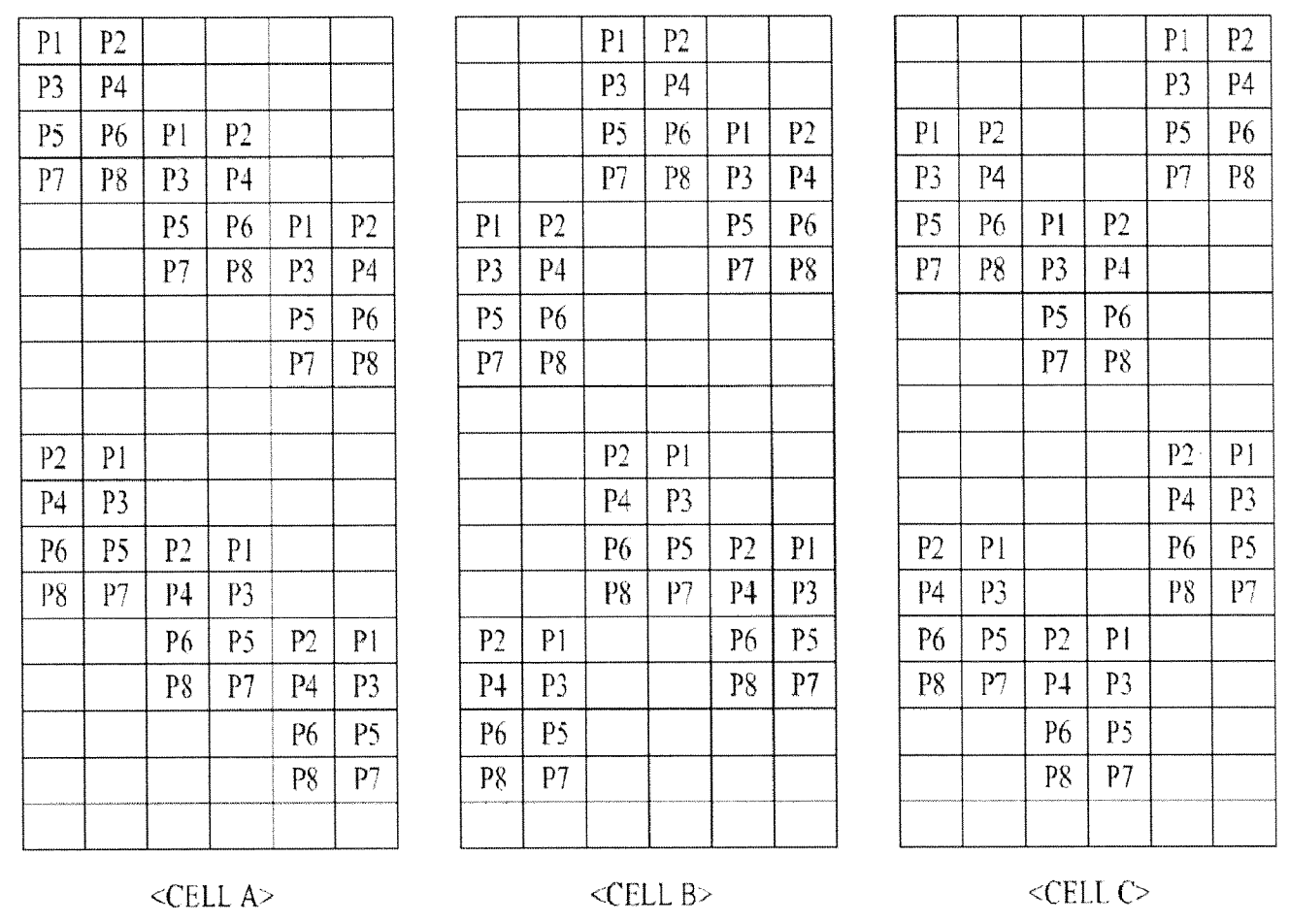

FIGS. 19 and 20 show that a pilot subcarrier allocation offset varies according to cells in a 4-Tx system and an 8-Tx system. In particular, FIG. 19 shows that the pilot subcarrier allocation offset is differently set to cells A, B and C in the 4-Tx system. And FIG. 20 shows that the pilot subcarrier allocation offset is differently set to the cells A, B and C in the 8-Tx system.

That is, the pilot allocation structure can be differently applied to the cells A, B and C. The applied shift offset value is applied in the number of subcarriers of 1 to 18. The 18 subcarriers correspond to the basic resource block size.

The shift offset value may be an integral multiple of the basic resource block size. Although the shift offset value is applied to the frequency axis in the present embodiment, it may be applied to the time axis.

If the number of contiguous cells is three or more and the above-described principle is expanded and applied, the structures shown in FIGS. 19 and 20 may be repeatedly used or may be applied in a state of being shifted by a predetermined subcarrier offset or a predetermined OFDM symbol offset.

Figure 21:
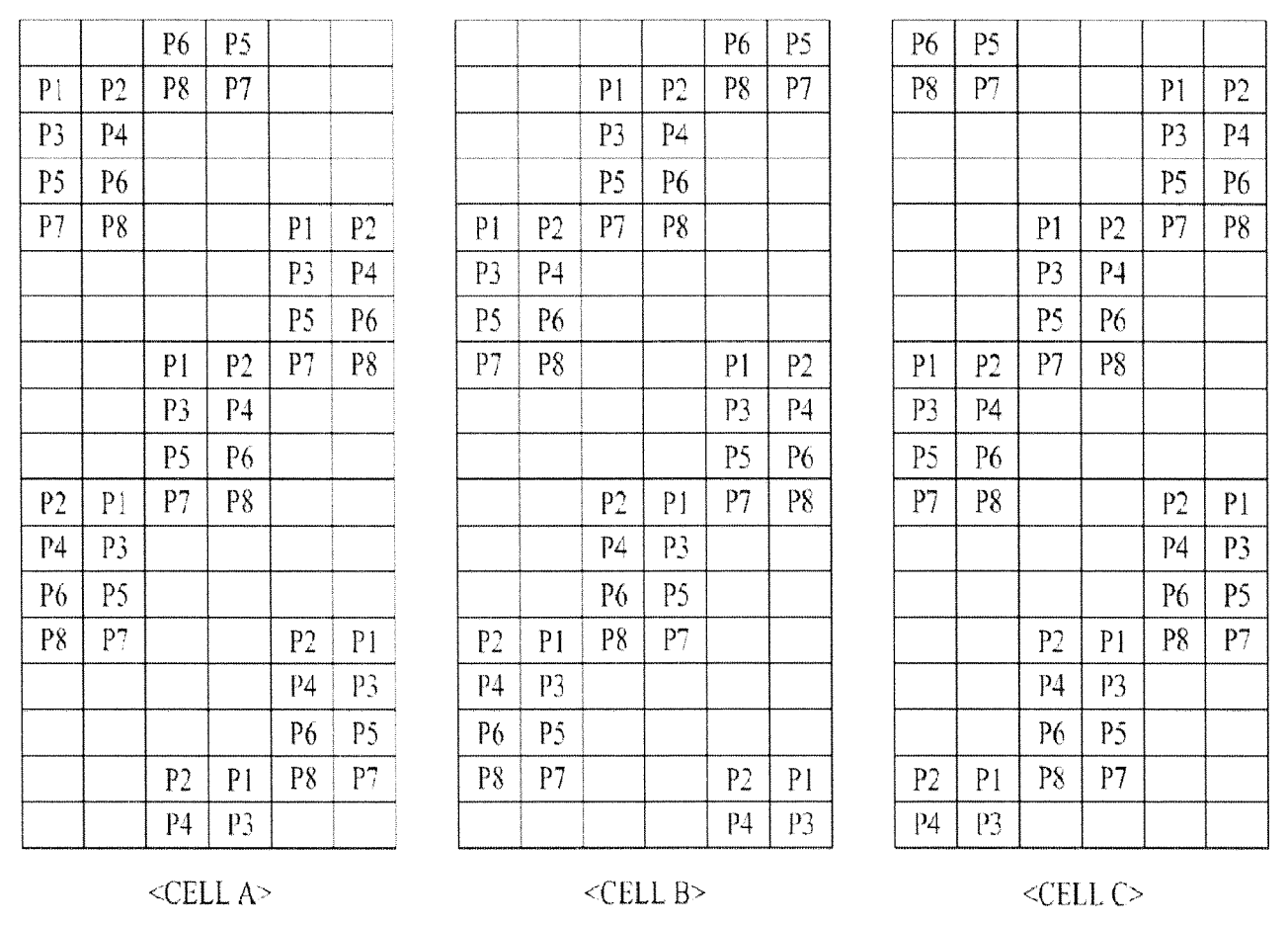
Figure 22:
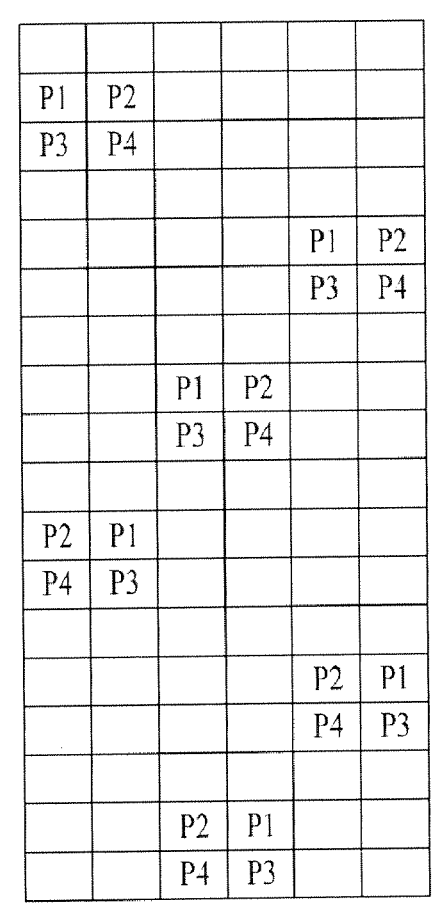

FIG. 21 shows another embodiment of the 8-Tx system shown in FIG. 20. FIG. 22 shows a pilot subcarrier allocation pattern according to another embodiment of the present invention.

In the eight transmission antennas, the pilots may not be allocated for all eight antennas due to the pilot overhead. That is, when the pilots are allocated only for the antennas 1, 2, 3 and 4, the overhead can be reduced. For example, such pilot allocation structure is applicable to a SFBC-CDD method. In the pilot allocation pattern shown in FIG. 22, a method of shifting and using the pilot pattern between contiguous cells is equal to that of the above-described embodiment.

Figure 23:
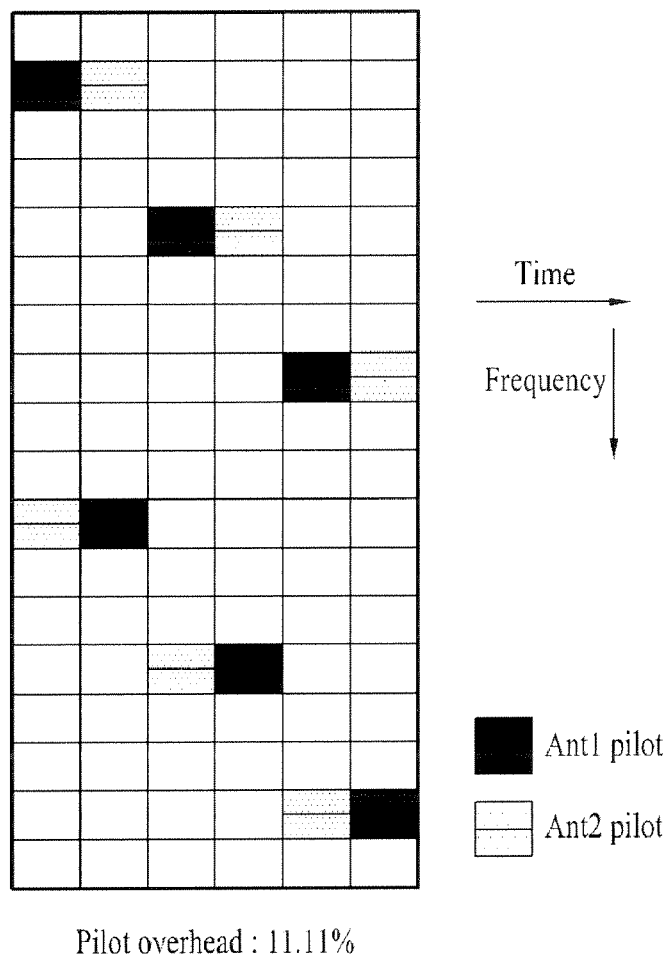
FIGS. 23~25 show pilot subcarrier allocation patterns in a 2-Tx system according to an embodiment of the present invention.
Figure 24:
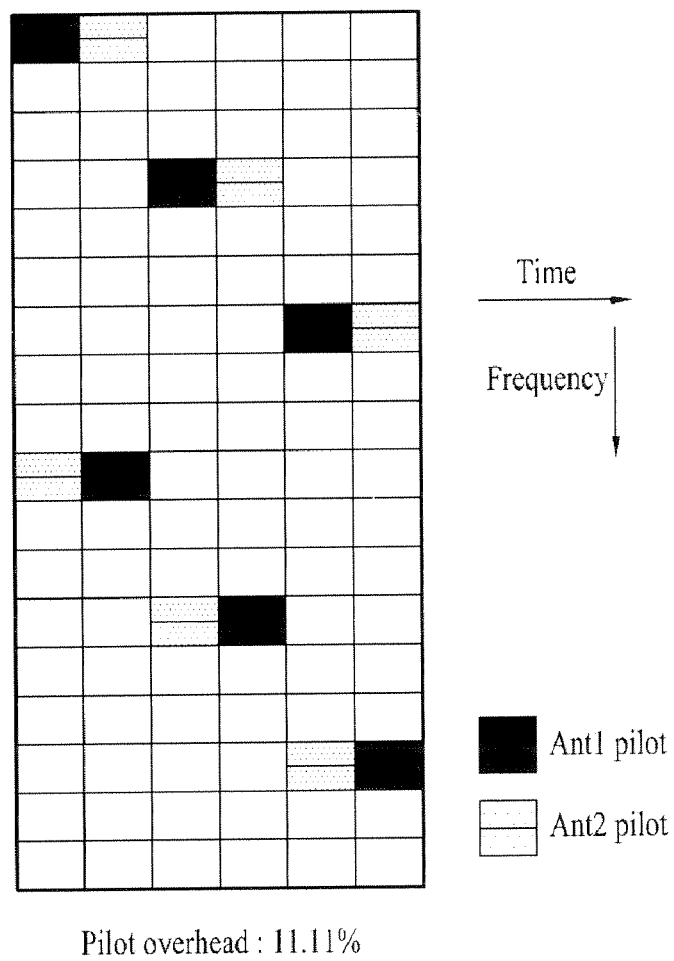
Figure 25:
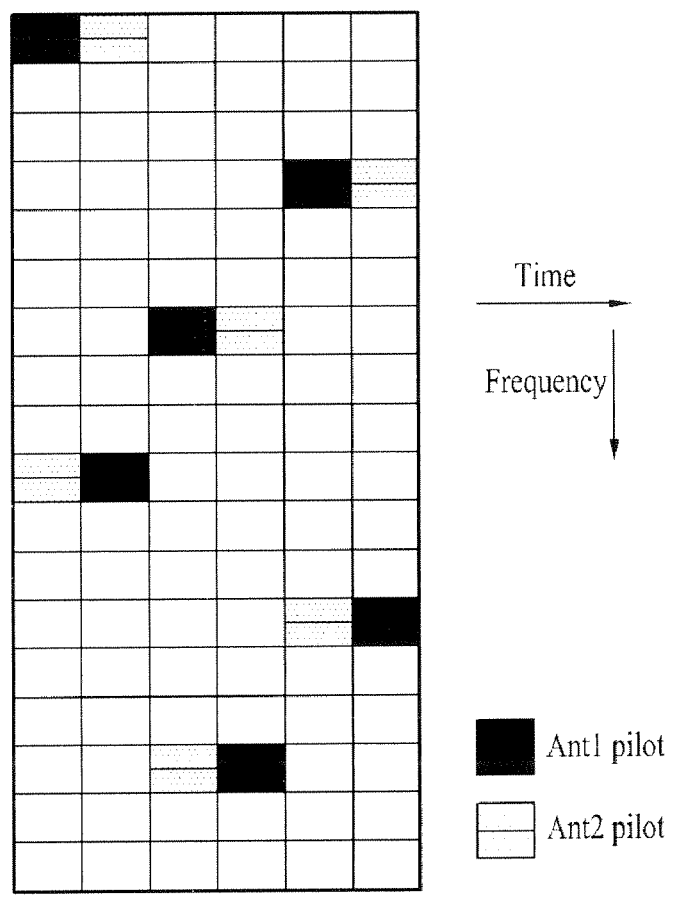

FIGS. 23~25 show pilot subcarrier allocation patterns in a 2-Tx system according to another embodiment of the present invention. The principle according to the above-described embodiment is equally applied to the pilot patterns shown in FIGS. 23~25. Thus, the pilot subcarriers for the first antenna and the pilot subcarriers for the second antenna form pairs and are contiguously arranged in two contiguous OFDM symbol areas. The pilot subcarriers for all antennas are set to be included in each of the OFDM symbol areas by the same number in order to equally set the transmission power allocated to the antennas at a specific time.

Preferably, the pilot subcarrier pairs are allocated at a spacing of nine subcarriers, in consideration of optimal granularity for the pilot subcarrier allocation in a coherence bandwidth. Further, the pairs of the pilot subcarriers for the first antenna and the pilot subcarriers for the second antenna are shifted by a predetermined number of subcarriers in a unit of two OFDM symbols. Although FIGS. 23 and 24 show that the shifted subcarrier spacing is a spacing corresponding to three subcarriers, for example, the subcarrier indexes are increased by three subcarriers, the shifted subcarrier spacing may be a predetermined multiple of three subcarriers, for example, six subcarriers, and may be applied such that the indexes are decreased by three subcarrier indexes. FIG. 25 shows that the shifted subcarrier spacing is set to be 6 subcarriers. FIG. 25 may also be construed that the shifted subcarrier spacing is applied such that the indexes are decreased by 3 subcarrier indexes.

As described above, the reason why the frequency-domain shift is set at a spacing corresponding to three subcarriers or the multiple of three subcarriers is because the pilot subcarriers are allocated in a unit of nine subcarriers and the pilot subcarrier allocation pattern is repeated with a predetermined period. The pilot pattern shown in FIGS. 23~25 may be equally and repeatedly applied to the time/frequency domain in the frame or the subframe. The positions of the pilots for the antenna 1 and the positions of the pilots for the antenna 2 may be exchanged without departing from the principal of this embodiment.

In the pilot allocation structure shown in FIG. 23, the pilot allocation indexes for the antennas are represented in detail as follows.

<Pilot Allocation Index for FIG. 23>
Antenna 1—
18k+1 when s is 0
18k+10 when s is 1
18k+4 when s is 2
18k+13 when s is 3
18k+7 when s is 4
18k+16 when s is 5
Antenna 2—
18k+10 when s is 0
18k+1 when s is 1
18k+13 when s is 2
18k+4 when s is 3
18k+16 when s is 4
18k+7 when s is 5
k: subcarrier index (k=0, 1, . . . ),
s: [OFDM symbol index] mod 6
(OFDM symbol index=0, 1, 2, . . . )

And, in the pilot allocation structure shown in FIG. 24, the pilot allocation indexes for the antennas may be represented in detail as follows.

<Pilot Allocation Index for FIG. 24>
Antenna 1—
18k when s is 0
18k+9 when s is 1
18k+3 when s is 2
18k+12 when s is 3
18k+6 when s is 4
18k+15 when s is 5
Antenna 2—
18k+9 when s is 0
18k when s is 1
18k+12 when s is 2
18k+3 when s is 3
18k+15 when s is 4
18k+6 when s is 5
k: subcarrier index (k=0, 1, . . . ),
s: [OFDM symbol index] mod 6
(OFDM symbol index=0, 1, 2, . . . )

In addition, in the pilot allocation structure shown in FIG. 25, the pilot allocation indexes for the antennas may be represented in detail as follows.

<Pilot Allocation Index for FIG. 25>
Antenna 1—
18k when s is 0
18k+9 when s is 1
18k+6 when s is 2
18k+15 when s is 3
18k+3 when s is 4
18k+12 when s is 5

Antenna 2—
18k+9 when s is 0
18k when s is 1
18k+15 when s is 2
18k+6 when s is 3
18k+12 when s is 4
18k+3 when s is 5
k: subcarrier index (k=0, 1, . . . ),
s: [OFDM symbol index] mod 6
(OFDM symbol index=0, 1, 2, . . . )

In the pilot allocation structure according to the above-described embodiment, if a preamble OFDM symbol is transmitted to a foremost portion of the subframe in a predetermined period, the pilot subcarriers may be changed so as to be applied to a second OFDM symbol and the subsequent OFDM symbols.

Figure 26:
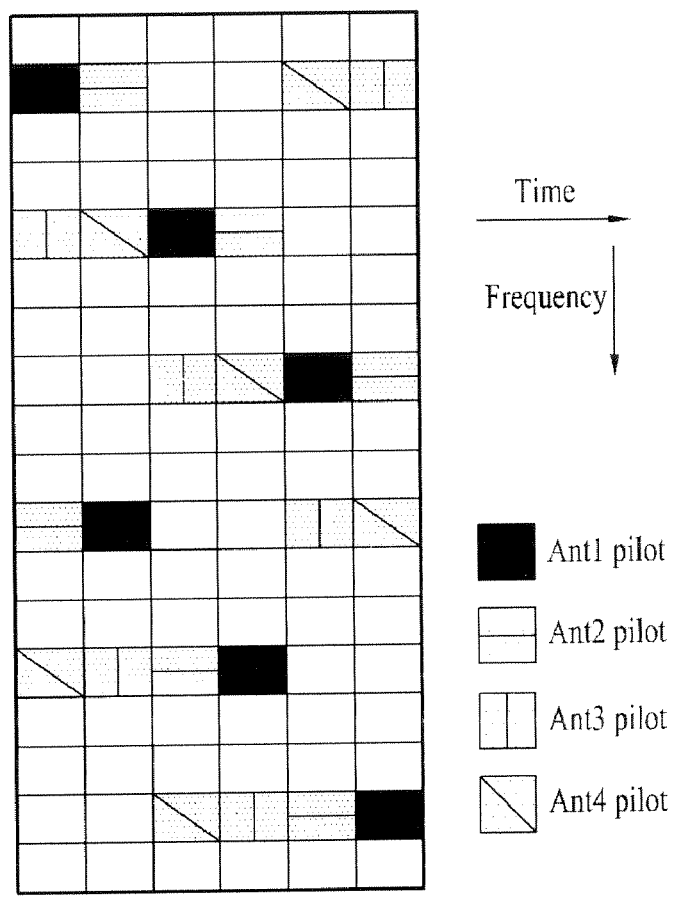
FIGS. 26 and 27 show pilot subcarrier allocation patterns in a 4-Tx system according to an embodiment of the present invention.
Figure 27:
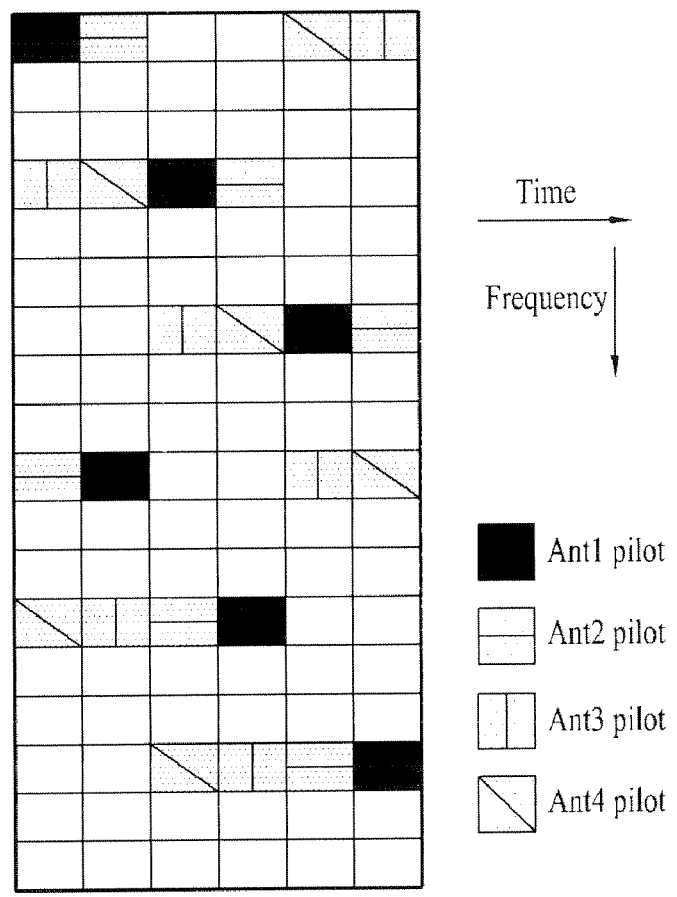

FIGS. 26 and 27 show pilot subcarrier allocation patterns in a 4-Tx system according to another embodiment of the present invention. The basic pilot allocation methods of FIGS. 26 and 27 are equal to those of the above-described embodiments. However, in the present embodiment, the pilot subcarriers for the four antennas are allocated to be contiguous to each other in contiguous four OFDM symbol areas.

In the pilot allocation structure shown in FIG. 26, the pilot allocation indexes for the antennas may be represented in detail as follows.

<Pilot Allocation Index for FIG. 26>
Antenna 1—
18k+1 when s is 0
18k+10 when s is 1
18k+4 when s is 2
18k+13 when s is 3
18k+7 when s is 4
18k+16 when s is 5
Antenna 2—
18k+10 when s is 0
18k+1 when s is 1
18k+13 when s is 2
18k+4 when s is 3
18k+16 when s is 4
18k+7 when s is 5
k: subcarrier index (k=0, 1, . . . ),
s: [OFDM symbol index] mod 6
(OFDM symbol index=0, 1, 2, . . . )
Antenna 3—
18k+4 when s is 0
18k+13 when s is 1
18k+7 when s is 2
18k+16 when s is 3
18k+10 when s is 4
18k+1 when s is 5
Antenna 4—
18k+13 when s is 0
18k+4 when s is 1
18k+16 when s is 2
18k+7 when s is 3
18k+1 when s is 4
18k+10 when s is 5
k: subcarrier index (k=0, 1, . . . ),
s: [OFDM symbol index] mod 6
(OFDM symbol index=0, 1, 2, . . . )

In the pilot allocation structure shown in FIG. 27, the pilot allocation indexes for the antennas may be represented in detail as follows.

<Pilot Allocation Index for FIG. 27>
Antenna 1—
18k when s is 0
18k+9 when s is 1
18k+3 when s is 2
18k+12 when s is 3

18k+6 when s is 4
18k+15 when s is 5
Antenna 2—
18k+9 when s is 0
18k when s is 1
18k+12 when s is 2
18k+3 when s is 3
18k+15 when s is 4
18k+6 when s is 5
k: subcarrier index (k=0, 1, ... ),
s: [OFDM symbol index] mod 6
(OFDM symbol index=0, 1, 2, ... )
Antenna 3—
18k+3 when s is 0
18k+12 when s is 1
18k+6 when s is 2
18k+15 when s is 3
18k+9 when s is 4
18k when s is 5
Antenna 4—
18k+12 when s is 0
18k+3 when s is 1
18k+15 when s is 2
18k+6 when s is 3
18k when s is 4
18k+9 when s is 5
k: subcarrier index (k=0, 1, ... ),
s: [OFDM symbol index] mod 6
(OFDM symbol index=0, 1, 2, ... )

FIG. 28 shows a pilot subcarrier allocation pattern in a 4-Tx system according to another embodiment of the present invention. The principle described in the above-described embodiments is similarly applied to the pilot pattern of FIG. 28. However, FIG. 26 shows an example that the pairs of pilots are arranged at the spacing of two subcarriers when the subcarriers for the first antenna and the subcarriers for the second antenna form a pair of pilots, and the subcarriers for the third antenna and the subcarriers for the fourth antenna form another pair of pilots. That is, in the present embodiment, the allocation may be performed such that two pairs of pilots are allocated to be contiguous to each other or not to be contiguous to each other.

The above-described functions may be performed by a processor such as a microprocessor, a controller, a microcontroller or an application specific integrated circuit (ASIC) which is coded so as to perform the functions. The design, development and implementation of the code are apparent to those skilled in the art on the basis of the description of the present invention.

A method of allocating pilot subcarriers according to the present invention is applicable to an IEEE 802.16m system. As described above, a basic principle such as pilot arrangement for equally allocating transmission power to antennas or pilot shift pattern setting is also applicable to other wireless communication systems by the same method.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of transmitting pilot signals by a transmitter in a multiple-input multiple-output (MIMO) antenna system using an orthogonal frequency division multiplexing (OFDM) scheme, the method comprising:
   allocating a first pilot P1 for a first antenna, a second pilot P2 for a second antenna, a third pilot P3 for a third antenna and a fourth pilot P4 for a fourth antenna to each of a plurality of OFDM symbols in a basic resource block comprising the plurality of OFDM symbols in a time domain and a plurality of subcarriers in a frequency domain; and
   transmitting the first, second, third, and fourth pilots P1 to P4 to a receiver,
   wherein the first, second, third, and fourth pilots P1 to P4 are allocated to two consecutive subcarriers in two consecutive OFDM symbols of the basic resource block to be a first pattern according to Table 1 or a second pattern according to Table 2:

TABLE 1

|  | even numbered OFDM symbol | odd numbered OFDM symbol |
|---|---|---|
| Subcarrier k | P1 | P2 |
| Subcarrier k + 1 | P3 | P4 | and

TABLE 2

|  | even numbered OFDM symbol | odd numbered OFDM symbol |
|---|---|---|
| Subcarrier k | P2 | P1 |
| Subcarrier k + 1 | P4 | P3, | wherein k is a subcarrier index, and
wherein the first pattern and the second pattern alternate with each other along the frequency domain in the two consecutive OFDM symbols.

2. A method of receiving pilot signals from a transmitter in a multiple-input multiple-output (MIMO) antenna system using an orthogonal frequency division multiplexing (OFDM) scheme, the method comprising:
   receiving, by a receiver, a first pilot P1 for a first antenna, a second pilot P2 for a second antenna, a third pilot P3 for a third antenna and a fourth pilot P4 for a fourth antenna in each of a plurality of OFDM symbols in a basic resource block, the basic resource block comprising the plurality of OFDM symbols in a time domain and a plurality of subcarriers in a frequency domain,
   wherein the first, second, third, and fourth pilots P1 to P4 are received, on two consecutive subcarriers in two consecutive OFDM symbols of the basic resource block, in a first pattern according to Table 1 or a second pattern according to Table 2:

TABLE 1

|  | even numbered OFDM symbol | odd numbered OFDM symbol |
|---|---|---|
| Subcarrier k | P1 | P2 |
| Subcarrier k + 1 | P3 | P4 | and

TABLE 2

|  | even numbered OFDM symbol | odd numbered OFDM symbol |
|---|---|---|
| Subcarrier k | P2 | P1 |
| Subcarrier k + 1 | P4 | P3, | wherein k is a subcarrier index, and
wherein the first pattern and the second pattern alternate with each other along the frequency domain in the two consecutive OFDM symbols.

3. A transmitter in a wireless communication system using an orthogonal frequency division multiplexing (OFDM) scheme for downlink and uplink communication, the transmitter comprising:

a multiple-input multiple-output (MIMO) antenna;

an OFDM modulator operably connected to the MIMO antenna; and a processor operably connected to the OFDM modulator and configured to:

allocate a first pilot P1 for a first antenna, a second pilot P2 for a second antenna, a third pilot P3 for a third antenna and a fourth pilot P4 for a fourth antenna to each of a plurality of OFDM symbols in a basic resource block, the basic resource block comprising the plurality of OFDM symbols in a time domain and a plurality of subcarriers in a frequency domain;

control the MIMO antenna to transmit the first, second, third, and fourth pilots P1 to P4 to a receiver, allocate the first, second, third, and fourth pilots P1 to P4 to two consecutive subcarriers in two consecutive OFDM symbols of the basic resource block to be a first pattern according to Table 1 or a second pattern according to Table 2:

TABLE 1

|  | even numbered OFDM symbol | odd numbered OFDM symbol |
| --- | --- | --- |
| Subcarrier k | P1 | P2 |
| Subcarrier k + 1 | P3 | P4 | and

TABLE 2

|  | even numbered OFDM symbol | odd numbered OFDM symbol |
| --- | --- | --- |
| Subcarrier k | P2 | P1 |
| Subcarrier k + 1 | P4 | P3, | wherein k is a subcarrier index, and wherein the first pattern and the second pattern alternate with each other along the frequency domain in the two consecutive OFDM symbols.

4. A receiver receiving pilot signals from a transmitter in a multiple-input multiple-output (MIMO) antenna system using an orthogonal frequency division multiplexing (OFDM) scheme, the receiver comprising:

a reception antenna;

a processor operably connected to the reception antenna and configured to control the reception antenna to receive a first pilot P1 for a first antenna, a second pilot P2 for a second antenna, a third pilot P3 for a third antenna and a fourth pilot P4 for a fourth antenna in each of a plurality of OFDM symbols in a basic resource block, the basic resource block comprising the plurality of OFDM symbols in a time domain and a plurality of subcarriers in a frequency domain, wherein the first, second, third, and fourth pilots P1 to P4 are received, on two consecutive subcarriers in two consecutive OFDM symbols of the basic resource block, in a first pattern according to Table 1 or a second pattern according to Table 2:

TABLE 1

|  | even numbered OFDM symbol | odd numbered OFDM symbol |
| --- | --- | --- |
| Subcarrier k | P1 | P2 |
| Subcarrier k + 1 | P3 | P4 | and

TABLE 2

|  | even numbered OFDM symbol | odd numbered OFDM symbol |
| --- | --- | --- |
| Subcarrier k | P2 | P1 |
| Subcarrier k + 1 | P4 | P3, | wherein k is a subcarrier index, and wherein the first pattern and the second pattern alternate with each other along the frequency domain in the two consecutive OFDM symbols.

5. The method of claim 1, wherein the first pattern and the second pattern are spaced from each other by a predetermined number of subcarriers in the two consecutive OFDM symbols.

6. The method of claim 5, wherein the first pattern and the second pattern in the two consecutive OFDM symbols are shifted by an integer multiple of 3 subcarriers in a next two consecutive OFDM symbols.

7. The method of claim 1, wherein the first pattern and the second pattern in the two consecutive OFDM symbols are shifted by an integer multiple of 3 subcarriers in a next two consecutive OFDM symbols.

8. The method of claim 2, wherein the first pattern and the second pattern are spaced from each other by a predetermined number of subcarriers in the two consecutive OFDM symbols.

9. The method of claim 8, wherein the first pattern and the second pattern in the two consecutive OFDM symbols are shifted by an integer multiple of 3 subcarriers in a next two consecutive OFDM symbols.

10. The method of claim 2, wherein the first pattern and the second pattern in the two consecutive OFDM symbols are shifted by an integer multiple of 3 subcarriers in a next two consecutive OFDM symbols.

11. The transmitter of claim 3, wherein the first pattern and the second pattern are spaced from each other by a predetermined number of subcarriers in the two consecutive OFDM symbols.

12. The transmitter of claim 11, wherein the first pattern and the second pattern in the two consecutive OFDM symbols are shifted by an integer multiple of 3 subcarriers in a next two consecutive OFDM symbols.

13. The transmitter of claim 3, wherein the first pattern and the second pattern in the two consecutive OFDM symbols are shifted by an integer multiple of 3 subcarriers in a next two consecutive OFDM symbols.

14. The receiver of claim 4, wherein the first pattern and the second pattern are spaced from each other by a predetermined number of subcarriers in the two consecutive OFDM symbols.

15. The receiver of claim 14, wherein the first pattern and the second pattern in the two consecutive OFDM symbols are shifted by an integer multiple of 3 subcarriers in a next two consecutive OFDM symbols.

16. The receiver of claim 4, wherein the first pattern and the second pattern in the two consecutive OFDM symbols are shifted by an integer multiple of 3 subcarriers in a next two consecutive OFDM symbols.

* * * * *